(12) United States Patent
Nitu et al.

(10) Patent No.: US 11,341,800 B2
(45) Date of Patent: May 24, 2022

(54) MOBILE KIOSK FOR INTELLIGENT SECURABLE DEVICES SYSTEM

(71) Applicant: BEST LOCKERS, LLC, Orlando, FL (US)

(72) Inventors: Christian Nitu, Beltsville, MD (US); Cory Finney, Beltsville, MD (US); John Zaniker, Severna Park, MD (US)

(73) Assignee: BEST LOCKERS, LLC, Orlando, FL (US)

( * ) Notice: Subject to any disclaimer, the term of this patent is extended or adjusted under 35 U.S.C. 154(b) by 0 days.

(21) Appl. No.: 16/152,144

(22) Filed: Oct. 4, 2018

(65) Prior Publication Data

US 2019/0035186 A1 Jan. 31, 2019

Related U.S. Application Data

(62) Division of application No. 14/728,887, filed on Jun. 2, 2015, now Pat. No. 10,096,183.

(Continued)

(51) Int. Cl.
*G07C 9/00* (2020.01)
*G07C 9/38* (2020.01)
(Continued)

(52) U.S. Cl.
CPC ........... *G07C 9/38* (2020.01); *G07C 9/00571* (2013.01); *G07C 9/00904* (2013.01);
(Continued)

(58) Field of Classification Search
CPC ...... G07C 9/00571; G07C 2009/00793; G07C 9/00563; G07C 9/00896; G07C 2009/00412; G07C 2009/00642; G07C 2009/00769; G07C 2009/00936; G07C 2209/63; G07C 9/00309; G07C 9/00904; G07C 9/00912; G07C 9/00944; G07C 2009/00277; G07C 2009/00349; G07C 9/0069; G07C 9/30; G07C 9/38; G07F 17/12; G07F 11/002; G07F 17/14;
(Continued)

(56) References Cited

U.S. PATENT DOCUMENTS 4,698,630 A 10/1987 Ellsberg
5,169,222 A 12/1992 Bollore et al.
(Continued)

*Primary Examiner* — Dionne Pendleton
(74) *Attorney, Agent, or Firm* — Foley & Lardner LLP

(57) ABSTRACT

A system and method of controlling a securable device may include establishing a centralized data repository with data representative of status of each securable device. Communications with a mobile kiosk executing on a mobile device of a user may be established. Responsive to receiving a request from the mobile kiosk to identify an available securable device local and accessible to the user, the centralized data repository may be accessed, at least one securable device that is available may be identified, and data associated with the identified available securable device(s) may be communicated to the mobile kiosk to cause the mobile kiosk to communicate at least a portion of the data to one of the securable device(s) to provide access thereto. Responsive to receiving a status update of the securable device accessed from the mobile kiosk, the centralized data repository may be updated with the status update.

24 Claims, 13 Drawing Sheets

Related U.S. Application Data

(60) Provisional application No. 62/006,678, filed on Jun. 2, 2014, provisional application No. 62/006,700, filed on Jun. 2, 2014.

(51) Int. Cl.
*H04W 4/80* (2018.01)
*G07F 9/00* (2006.01)

(52) U.S. Cl.
CPC ......... *G07C 9/00912* (2013.01); *G07F 9/001* (2020.05); *G07F 9/002* (2020.05); *H04W 4/80* (2018.02); *G07C 2009/00277* (2013.01); *G07C 2009/00349* (2013.01); *G07C 2009/00769* (2013.01)

(58) Field of Classification Search
CPC . G07F 5/26; G07F 9/105; G07F 17/13; G07F 9/002; A47B 81/00; A47B 2220/0091; A47B 61/04; A47B 97/00; E05B 2047/0048; E05B 2047/0072; E05B 2047/0095; E05B 2047/0016; E05B 2047/002; E05B 2047/0022; E05B 2047/0058; E05B 2047/0068; E05B 2047/0069; E05B 2047/0071; E05B 2047/0091; E05B 2047/0097; E05B 39/00; E05B 39/04; E05B 41/00; E05B 45/06; E05B 47/00; E05B 47/0001; E05B 47/0012; E05B 53/008; E05B 63/0004; E05B 65/06; G08B 13/19656; G08B 13/1966; G08B 13/19636; G08B 13/19695; H04W 4/029; H04W 12/00504; H04W 12/00522; H04W 12/06; H04W 12/0608; H04W 28/0231; H04W 40/02; H04W 4/023; H04W 4/027; H04W 4/33; H04W 4/80; H04W 52/223; H04W 52/40; H04W 8/183; H04W 8/24; A41D 13/0002; A41D 19/01594; A41D 1/002; A42B 3/006; A42B 3/0406; A43B 3/0005; A47F 10/02; A61F 9/029; G01B 11/28; G06F 3/0488; G08C 23/02; H02J 2007/0096; H02J 50/10; H02J 7/0027; H02J 7/025; H02J 7/042; H04B 17/3913; H04B 1/3833; H04H 20/71; H04L 1/0006; H04L 2209/56; H04L 63/0823; H04L 63/0838; H04L 63/0853; H04L 63/0869; H04L 63/18; H04L 67/02; H04L 9/3234; H04L 9/3263; H04N 7/181; H04Q 9/00; Y02D 70/00; Y02D 70/1244; Y02D 70/142; Y02D 70/144; Y02D 70/146; Y02D 70/162; Y02D 70/164; Y02D 70/23; Y02D 70/26; A47G 2029/145; A47G 2029/149; A47G 29/141

See application file for complete search history.

(56) References Cited

U.S. PATENT DOCUMENTS

| | | |
|---|---|---|
| 5,231,272 A | 7/1993 | Mardon |
| 5,345,379 A | 9/1994 | Brous et al. |
| 5,894,277 A | 4/1999 | Keskin et al. |
| 5,946,660 A | 8/1999 | McCarty et al. |
| 6,185,773 B1 | 2/2001 | Goedde |
| 6,655,180 B2 | 12/2003 | Gokcebay et al. |
| 6,694,217 B2 | 2/2004 | Bloom |
| 6,791,450 B2 | 9/2004 | Gokcebay et al. |
| 6,806,807 B2 | 10/2004 | Cayne et al. |
| 6,879,243 B1 | 4/2005 | Booth et al. |
| 6,882,269 B2 | 4/2005 | Moreno |
| 6,999,825 B2 | 2/2006 | Inomata |
| 7,068,149 B2 | 6/2006 | Lee et al. |
| 7,108,171 B1 | 9/2006 | Ergo et al. |
| 7,176,782 B2 | 2/2007 | Shitan |
| 7,323,967 B2 | 1/2008 | Booth et al. |
| 7,445,300 B2 | 11/2008 | Collins et al. |
| 7,477,132 B2 | 1/2009 | Mayer et al. |
| 7,705,731 B2 | 4/2010 | Trammell, III |
| 7,880,585 B1 * | 2/2011 | Aronson ............... E05B 45/005 340/5.73 |
| 8,639,578 B2 | 1/2014 | Barber et al. |
| 11,082,839 B2 * | 8/2021 | Jacobson ............... H04W 12/06 |
| 2003/0141840 A1 | 7/2003 | Sanders |
| 2003/0227550 A1 | 12/2003 | Manico et al. |
| 2005/0190037 A1 | 9/2005 | Shitan et al. |
| 2008/0170355 A1 | 7/2008 | Kyriakides et al. |
| 2009/0033456 A1 | 2/2009 | Castillo et al. |
| 2009/0112638 A1 * | 4/2009 | Kneller ................... G06Q 10/00 705/5 |
| 2009/0267564 A1 | 10/2009 | Gerber |
| 2010/0102780 A1 | 4/2010 | Koh |
| 2011/0301748 A1 | 12/2011 | Lecarpentier |
| 2012/0078413 A1 | 3/2012 | Baker, Jr. |
| 2012/0098493 A1 | 4/2012 | Budike |
| 2012/0127980 A1 * | 5/2012 | Quinn ................... H04W 8/005 370/338 |
| 2012/0138548 A1 | 6/2012 | Young |
| 2014/0035721 A1 * | 2/2014 | Heppe ................ G07C 9/00571 340/5.54 |
| 2015/0112887 A1 * | 4/2015 | Camp ................ G06Q 10/0836 705/339 |
| 2015/0120602 A1 * | 4/2015 | Huffman ............... G06Q 10/083 705/339 |
| 2015/0254760 A1 * | 9/2015 | Pepper .................... G07F 17/12 705/5 |
| 2016/0133074 A1 * | 5/2016 | Amdahl ............. G07C 9/00571 340/5.54 |
| 2016/0180623 A1 | 6/2016 | Rashkovan et al. |
| 2016/0189147 A1 * | 6/2016 | Vanczak ............... G06Q 20/425 705/71 |
| 2017/0016249 A1 * | 1/2017 | Johnson ................... E05B 39/00 |
| 2017/0032597 A1 | 2/2017 | Johnson |
| 2017/0244262 A1 | 8/2017 | Schadow et al. |

* cited by examiner

MOBILE KIOSK FOR INTELLIGENT SECURABLE DEVICES SYSTEM

RELATED APPLICATIONS

This is a Divisional Application of U.S. patent application Ser. No. 14/728,887 filed on Jun. 2, 2015, entitled "MOBILE KIOSK FOR INTELLIGENT SECURABLE DEVICES SYSTEM," which claims priority to U.S. Provisional Patent Applications having Ser. Nos. 62/006,678, filed Jun. 2, 2014 and entitled "INTELLIGENT ACCESS OF ELECTRONIC LOCKS," and 62/006,700, filed Jun. 2, 2014 and entitled "RETROFITTED INTELLIGENT (sic.) ELECTRONIC LOCK," the contents of which are hereby incorporated by reference in their entirety.

BACKGROUND

Mechanical lockers are used in both concessional and non-concessional venues. In concessional venues, such as airports, bus and train stations, malls, theme parks, and ski resorts, users generally pay to use the lockers. In non-concessional venues, such as schools and fitness centers, users are typically not required to pay to use the lockers. There are a number of problems associated with coin-operated, mechanical locking systems that require payment or not for use. These problems include the fact that each locker may only accept a limited number of coins, and those coins are the only acceptable method of payment. Coin-operated lockers require the user to access lockers with a separate key, issued upon purchase of the locker. As a result, a third-party must collect the coins from the system and the vendor/owner cannot always account for the correct amount of money. Another problem with mechanical lockers is that keys must be used to operate them. These keys are commonly lost or stolen, thereby creating maintenance and security problems. For non-concessional venues, users generally bring their own keys and locks to use the services of locker storage. Many times, users forget to bring their keys or locks or forget the passcode to regain access into occupied lockers, resulting in further complications and issues.

Electronic locker systems are typically configured the same manner, where each system includes multiple lockable storage enclosures, a controller unit that often includes a personal computer (PC) or other computing device, electronic locks, and a credit card reader or a cash depository to enable users to rent the lockable storage enclosures. The electronic locker systems also include power systems, cabling, electronic drivers, ticket printers, user interfaces (e.g., touch screen), and so on. Electronic locker companies compete for new business by entering into revenue sharing business arrangements because, in most cases, the cost of electronic lockers is too expensive for venues to purchase and because the venues typically do not want to be responsible for or are ill-equipped to handle maintenance of the electronic locker systems. As understood in the art, the most complicated and expensive manufacturing and assembly costs are the controller unit and power components.

SUMMARY

Disclosed herein are embodiments of methods and systems for operating "smart lockers" and other securable devices using a mobile kiosk, thereby reducing the complications and cost of conventional kiosks or controller units and supporting electronics and power components. The smart lockers may include local, non-networked locking devices configured to secure a securable device (e.g., locker). The use of a mobile kiosk may be applied to concessional and non-concessional storage units (e.g., lockers) that may hold any items for temporary or permanent storage. The mobile kiosk may be configured by a combination of software executed on a mobile device, such as a smartphone, that may operate in conjunction with a remote management server, such as a management server operating in the "cloud" and accessible to the mobile device via a communications network.

The mobile kiosk may use inherent technologies of mobile devices that provide for short-range and long-range communications paths and protocols. The short-range or local communications protocols may include a set of wireless technologies including, but not limited to, Bluetooth, smart Bluetooth, WiFi, NFC, Zigbee, RFID, or any other local communications protocol to communicate with smart lockers. The long-range communications protocols may include conventional telecommunications protocols, such as GSM, CDMA, or other wireless communications protocol.

Through use of a mobile kiosk, a user may be able to rent a smart locker (or other securable device) via a mobile device in conjunction with a remote management server via a long-range communications protocol, and the mobile kiosk may communicate with a selected or assigned smart locker via a short-range communications protocol. By configuring smart lockers to interface with mobile kiosks, the complexity and expense of a conventional kiosk and supporting electronics and cabling may be reduced or eliminated. The mobile kiosk may enable the user, after renting a smart locker, to lock and unlock the smart locker via the mobile kiosk or be independent of the mobile kiosk depending on the configuration of the user interface of the smart locker. In one embodiment, the user can use a mobile device or the mobile kiosk to directly communicate with individual smart lockers as opposed to the smart lockers communicating directly with a central control kiosk. Using mobile kiosks allows users to not only unlock and lock the smart lockers, but also view usage history, pay for rental, share access with other users, and reserve the smart lockers.

In a configuration in which a local, mobile kiosk may be fixedly positioned and associated with a smart locker system, payment hardware may include, but not be limited to, credit card readers, NFC readers or EMV readers. In one embodiment, rather than using conventional payment methods, other online payment methods may be employed, such as through payment services, such as PayPal®, Apple Pay®, or other online payment service in which the mobile kiosk (e.g., smart phone or tablet) capabilities are used to eliminate the need for a hardware device at the lockers. Other apps or online applications (e.g., websites) that enable card payment methods may be utilized. The local, mobile kiosk operating on a tablet or other monitor that is wirelessly in communication with the smart lockers enables a user to control access to the smart lockers. In one embodiment, individual smart lockers are outfitted with an embedded printed circuit board in conjunction with an electronically controlled lock that acts as a locker controller. The locker controller may include, but not be limited to, a number of components, such as illumination device (e.g., LED), communications modules (e.g., Bluetooth module, WiFi module), GPS circuit, network interface, alarm sensor, processing unit, and local sensor (e.g., NFC radio, RFID reader). In another embodiment, the locker controllers may be connected wirelessly or wired (daisy chained) to a "mother" smart locker controller that handles the unlocking/locking commands to a plurality of smart lockers.

One embodiment of a securable device within a set of securable devices that enable users to secure items may include a computing unit, a memory unit in communication with the computing unit, a charge device in communication with the computing unit and the memory unit, a short-range communications device in communication with the computing unit, and configured to communicate a short-range wireless communications protocol, and an electromechanical lock device in communication with the computing unit. The short-range communications device may be configured to enable a user operating a mobile kiosk on a mobile device capable of communicating using the short-range communications protocol to communicate data with the computing unit. The computing unit may be configured to process data received from the mobile device. Responsive to determining that the data is addressed to the securable device from among the set securable devices, the computing unit may be configured to (i) process the data to control the electromechanical lock device of the securable device and (ii) update status data of the securable device. Status data may be communicated via the short-range communications protocol to the mobile kiosk to cause the mobile kiosk to update a data repository inclusive of status data of the set of securable devices with the status data of the securable device.

One embodiment of a method of controlling a securable device in a set of securable devices may include establishing a centralized data repository with data representative of status of each securable device in the set of securable devices. Communications with a mobile kiosk executing on a mobile device of a user may be established. Responsive to receiving a request from the mobile kiosk to identify an available securable device local and accessible to the user, the centralized data repository may be accessed, at least one securable device that is available may be identified, and data associated with the identified available securable device(s) may be communicated to the mobile kiosk to cause the mobile kiosk to communicate at least a portion of the data to one of the securable device(s) to enable the user to access the securable device. Responsive to receiving a status update of the securable device accessed by the user from the mobile kiosk, the centralized data repository may be updated with the status update of the associated securable device.

One embodiment of a mobile kiosk may include machine-readable instructions configured to execute on a mobile device, and, when the machine-readable instructions are executed by the mobile device, cause the mobile device to communicate a request via a long-distance communications path to a management server, where the request may include an identifier associated with multiple securable devices. Responsive to one of the securable devices being assigned to a user of the mobile kiosk, a control signal may be communicated via a local communications path with the assigned securable device, where the control signal may cause the securable device to transition from a locked state to an unlocked state. Responsive to receiving a status update from the securable device via the local communications path of the securable device transitioning from the locked state to the unlocked state, the status update of the securable device may be communicated via the long-distance communications path to the management server.

One embodiment of a process of controlling an electromechanical lock that is electronically controlled may include establishing, by a communications device associated with the electromechanical lock, a local communications link with a mobile device. The electromechanical lock may be responsive to a control signal including a network identifier. In response to receiving a control signal via the local communications path, the control signal may cause the securable device to transition between a locked state and an unlocked state. In response to the electromechanical lock transitioning between the locked state and the unlocked state, a status update may be communicated via the local communications path of the securable device transitioning between the locked state and the unlocked state.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
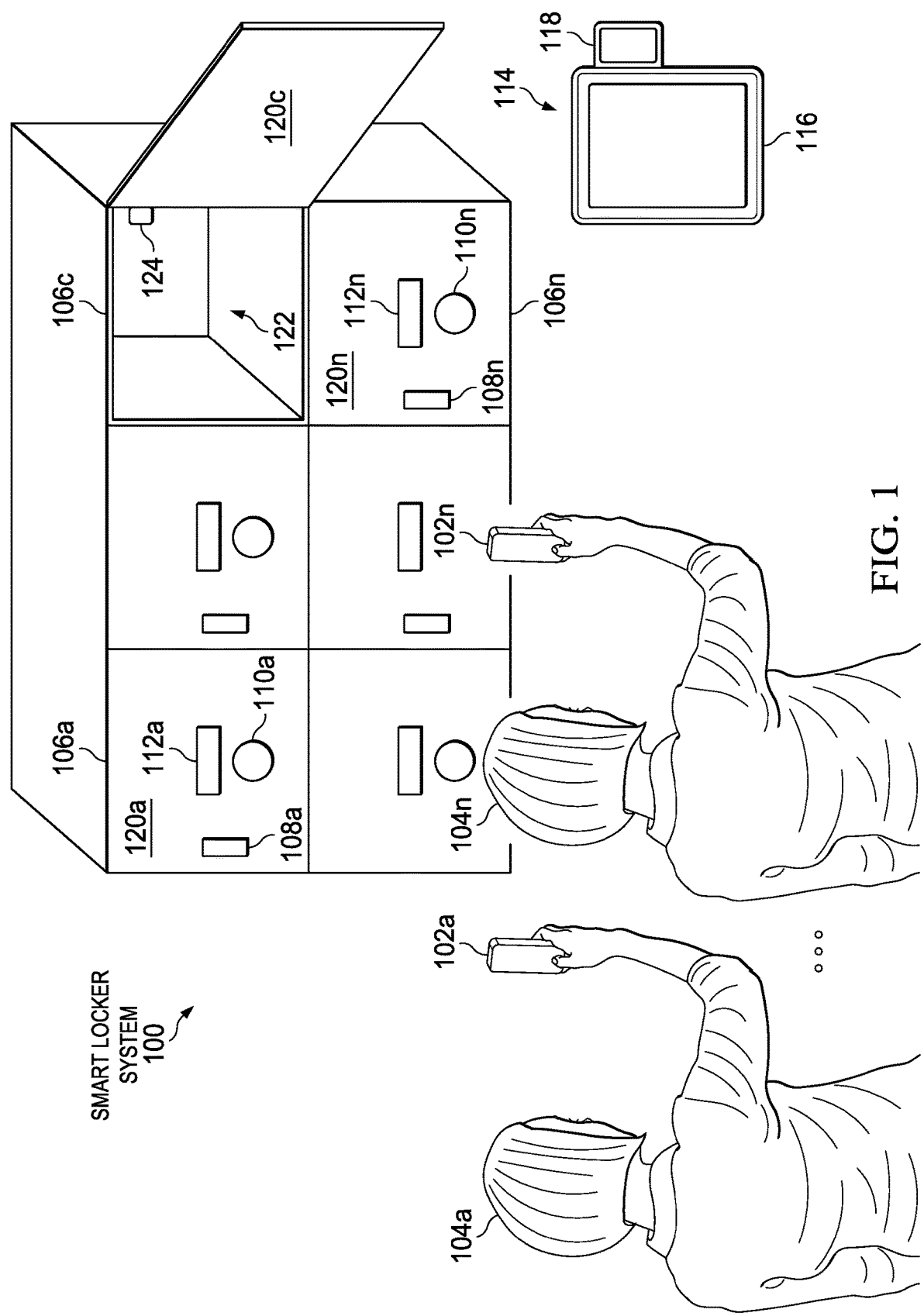
FIG. 1 is an illustration of an illustrative smart electronic locker system configured to be accessed via mobile kiosks.

With regard to FIG. 1 an illustration of an illustrative "smart" electronic locker system 100 configured to be accessed via mobile kiosks 102a-102n (collectively 102) being operated by users 104a-104n (collectively 104) is shown. The mobile kiosks 102 may be configured as machine-readable instructions (e.g., mobile app, website on a mobile browser) being executed by a mobile device, such as a smart phone. The electronic locker system 100 may include multiple electronic lockers or "smart lockers" 106a-106n (collectively 106) that include electronically controlled locks or "smart locks" 108a-108n (collectively 108). Each of the smart locks 108 may be configured with a wireless transceiver, processing unit, memory, motor driver, battery or charge device for an electromechanical lock, as understood in the art. The smart locks 108 may be non-networked devices in that there is no local, hardwired kiosk with which the smart locks 108 communicate. By using mobile kiosks 102 operating on mobile devices of users 104, the smart locks 108 may be accessible by the users 104, thereby eliminating the complexity and costs typically associated with conventional kiosks that are generally hardwired to the electronic locks of lockers. In one embodiment, a battery of the smart lock may be charged using a solar panel or other energy collection and conversion device, such as wireless power. In alternative embodiments, the "smart locks" 108 may be configured as individual locking structures that may secure various items, such as mobility devices (e.g., bicycles, scooters, etc.), safes within hotel rooms or elsewhere, or any other item that may be secured by a smart lock that operates in the same or similar manner as smart locks 108 when operating within the smart lockers 106.

The electronic locker system 100 may be configured with individual electronic lockers 106 that serve as temporary storage for personal items in indoor or outdoor venues. In an alternative embodiment, the individual electronic lockers 106 may be operated by delivery services to deliver packages or other items for customers to pick up at the lockers 106. In such a delivery service configuration, the service may assign a locker 106a to a user, and the user may use a mobile kiosk 114.

In one embodiment, a mobile kiosk 114 may be configured in the form of a mobile device, such as a tablet, held and operated by an operator or attendant, but possibly fixedly positioned for security reasons. The mobile kiosk 114 may be in local communication range of the electronic locker system 100 so that a local wireless communications protocol, such as Bluetooth or WiFi, may be utilized to communicate with and, optionally, control operation of the smart locks 108. The mobile kiosk 114 may be configured to function the same or similar to operation of the mobile kiosks 102, as further described hereinbelow. In one embodiment, the mobile kiosk 114 may be fixedly positioned by a mounting bracket 116 onto a wall (not shown) or a panel of the electronic locker system 100. In an alternative embodiment, the mobile kiosk 114 may be carried by an operator to assist users to rent or otherwise access the electronic lockers 106 or other devices (e.g., mobility devices) that are secured by smart locks. In one embodiment, the mobile kiosk 118 may include a payment processor 118 that is a credit or debit card reader or Europay, MasterCard, and Visa (EMV) reader to read integrated circuit cards ("chip cards") that enables a user to swipe or otherwise read a credit card or debit card, among other ways for payments to be made by the users 104. For example, the payment processor 118 may include a near field communication (NFC) circuit that may enable a user to pay via a "tap" of his or her mobile phone with NFC payment capability using a mobile wallet, as understood in the art. Alternative payment methods, such as PayPal®, Apple Pay, Android Pay, or other payment methods may be utilized.

The smart lockers 106 may include front doors 120a-120n (collectively 120) on which the smart locks 108 are respectively secured, and used to secure goods within the smart lockers 106. In one embodiment, as shown within a compartment 122 of smart locker 106c, a button or other user interactive electronic device 124 may enable an operator operate to cause a signal to be sent via a mobile device, such as mobile kiosk 114 to provision the smart locker 106c in the electronic locker system 100 to be recognized and, optionally, assigned an identifier (ID). The button 124 may be temporarily or fixedly positioned. Alternatively, rather than using a button 124, a sticker or other non-electronic indicia inclusive of a unique identifier associated with respective smart lockers 106 may be used and scanned or otherwise utilized by an electronic device, including the respective smart locks or provisioning mobile device to provision each smart locker. In yet another embodiment, an RFID tag or NFC tag may be positioned within each of the smart lockers 106 to provide for provisioning of the smart lockers 106. A communication that includes a unique identifier generated by the button or non-electronic indicia to a management server enables the server to quickly be provisioned.

Utilizing the button 124 and provisioning process enables use of any lockers or securable device, regardless of size, to be installed flexibly and more efficiently. In one embodiment, the smart locks 108 may receive or generate a signal inclusive of an identifier created or identified by the button, sticker, electronic tag, or otherwise, and communicate the identifier to a management server via the mobile kiosks 102, for example. In another embodiment, the smart locks 108 may communicate a network address, such as an IP address, MAC address, or other network address, along with the unique identifier (or other information, such as name of physical location) to the management server 210 via the mobile kiosks 102.

As previously described, the mobile kiosks 102 may be mobile devices, such as smart phones, configured to execute instructions in the form of a mobile app or website that integrates with various features of the mobile devices. The mobile kiosks 102 may operate as a communication bridge for a management server (see, for example, FIG. 2A) executing on a communications network, such as the Internet, to enable users 104 to access the smart lockers 106. In one embodiment, the mobile kiosks 102 may enable (i) confirmation code(s) to be communicated via text, email, or other communication protocol, (ii) receipts to electronically communicated to the mobile device, (iii) short-range communications (e.g., NFC, Bluetooth) to be used to unlock/lock a smart locker that has been rented by communicating with (e.g., "tapping" an NFC reader 112a) to communicate a verification code with or without presentment to the user, (iv) locking and unlocking a smart locker by using RFID communications with a passive RFID reader to communicate a lock and unlock code, for example, (iv) communication of instructions to a user, (v) imaging an indicia associated with a smart locker using a camera feature rather than having to enter an indicia (e.g., locker number) into a text field or otherwise, (v) usage (e.g., lock, unlock, door open, door close) verification of a smart lock and locker door to be communicated via the mobile kiosk to the management server, and so forth.

The mobile kiosks 102 may further be configured to provide status of some or all of the smart lockers 106 in the system within a given region (e.g., locker bank, section of an amusement park, building), purchase temporary rental duration, reserve lockers remotely, view characteristics (e.g., size) of lockers, and unlock/lock lockers through a mobile device. The mobile kiosks 102 may also provide for status notifications of the smart lockers 106, where the status notifications may include duration of time that each of the smart lockers 106 have remaining for current rentals, notice when a smart locker becomes available in response to a user releasing the locker, add a name and other information (e.g., telephone number) to a queue for the smart lockers 106 for notification of an available locker, and so on.

To assist users in the transactions of the electronic locker system 100, a PCB board (not shown) may be used within each of the smart lockers 106 of the electronic locker system 100, selectably connected wirelessly via a local communications protocol to the mobile kiosks 102, and/or connected wirelessly to the mobile kiosk 114. The mobile kiosks 102 may provide for payment via a user interface (not shown) via the management server or other remote payment system, and the mobile kiosk 114 may include the payment processor 118, as previously described. The mobile kiosk 114 may also be configured to enable a user to operate pay for and interface with the smart lockers in the same manner as provided by the mobile kiosks 102 being operated by mobile devices of the users 104. By providing a simple tablet for consumers to rent lockers and/or access lockers, a user who stores his or her mobile device (and mobile kiosk) in a locker can later unlock the locker using the mobile kiosk 114. In an alternative configuration, the smart lockers 106 may include a keypad that may be used by the user to lock and unlock the respective smart locks 108.

Figure 2A:
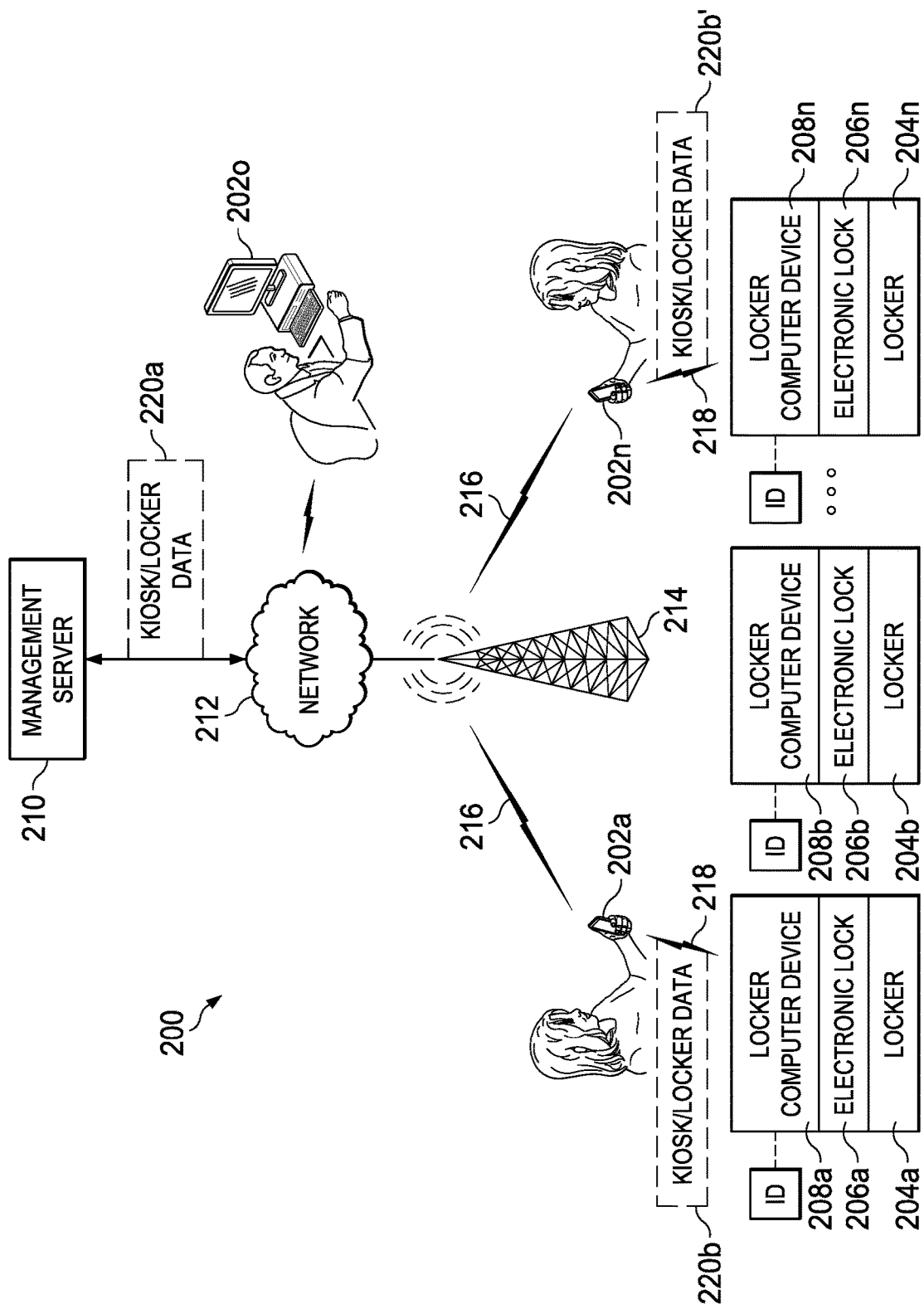
FIG. 2A is an illustration of an illustrative smart locker system environment that utilizes mobile kiosks for accessing smart lockers.

With regard to FIG. 2A, an illustration of an illustrative smart locker system environment 200 that utilizes mobile kiosks 202a-202n (collectively 202) for accessing smart lockers 204a-204n (collectively 204) is shown. The smart lockers 204 are shown to include respective electronic or electromechanical locks 206a-206n (collectively 206) and corresponding locker computer devices 208a-208n (collectively 208). The electromechanical locks 206 may be slave devices to respective locker computer devices 208, which operate as master devices, that control operation of the respective electronic locks 206.

As shown, the smart locker system environment 200 includes a management server 210 that operates as a central controller or repository with which the local kiosks 202 communicate via communications network 212 when a user is seeking to rent or otherwise interact with a smart locker 204. In communicating with the management server 210, the mobile kiosks 202 use a long-range communications channel or path 216 that utilizes a long-range communications protocol, such as a mobile communications channel and protocol, as understood in the art via mobile communications network equipment 214. Between the mobile kiosks 202 and locker computer device(s) 208, a local communications channel (e.g., Bluetooth) 218 may be established and a local communications protocol may be utilized.

Figure 2B:
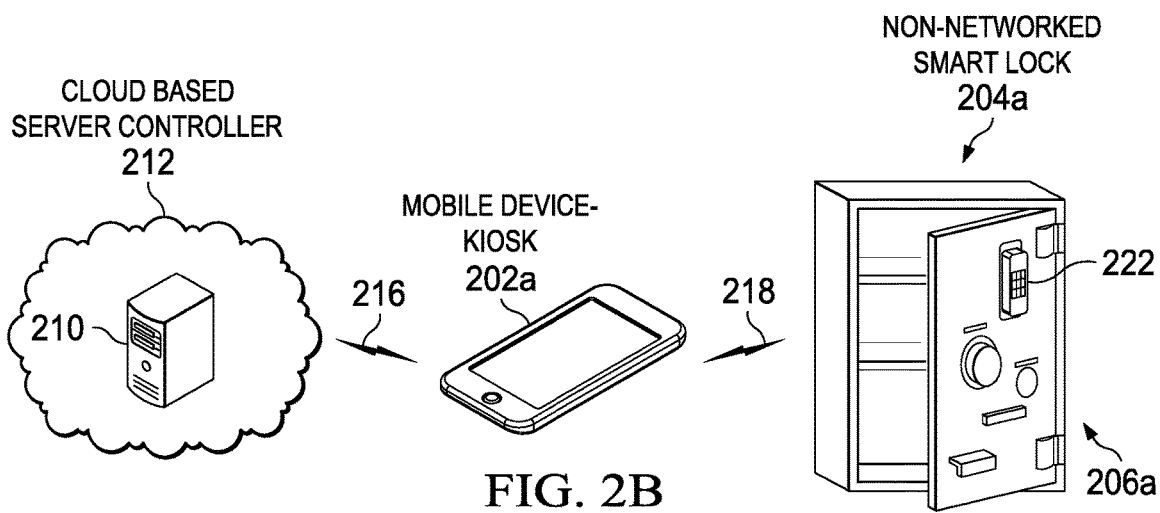
FIG. 2B is an illustration of a high-level view of a mobile device configured as a mobile kiosk that operates to communicate with a smart locker and a cloud-based management server or controller.

With regard to FIG. 2B, an illustration of a high-level view of a mobile device configured as a mobile kiosk 202a that operates to communicate with a smart locker 204a that is non-networked and a cloud-based management server or controller 210 is shown. The mobile kiosk 202a provides for a communications bridge between the management server 210 and smart lock 206a of the smart locker 204a. The mobile kiosk 202a may be configured using a mobile app or by providing access to a webpage using a web browser, for example.

In one embodiment, a user may be able to reserve one of the smart lockers 204 prior to visiting a locker facility using a desktop or laptop computer 202o or a mobile kiosk 202a, where the mobile kiosk 202a would reserve one of the smart lockers 204 or other securable device via a management server without having to be in local communication proximity with the smart lockers 204. Thereafter, the user may become in local communication with the smart lockers 204 with the mobile kiosk 202, to initiate a rental period.

In serving as a communications bridge, the mobile kiosk 202a may provide limited kiosk functionality, such as providing a user interface that enables a user (i) to select a locker type and term of rental, (ii) to enable a user to pay for the rental, (iii) to select a PIN to lock and unlock the smart lock 206a, and (iv) to provide communications bridge functionality utilizing long-range and short-range communications protocols between the smart lock 206a and management server 210 to enable the management server 210 to perform the remainder of the kiosk functions. As a bridge, the mobile kiosk 202a may enable a smart locker 204a to communicate status updates via the mobile kiosk 202a, where status updates may include, but not be limited to, locker characteristics, time stamps, physical location (geographic location and/or position within a locker bank), lock status, RFID status, NFC status, LED status, Bluetooth status, door status (e.g., opened/closed), or any other information indicative of status of the smart locker 204a. The locker computer device 220 may receive a request to unlock a locker from a mobile kiosk using a short-range communications protocol. The request may include a code, such as a 4-digit PIN, and the locker computer device 208a may verify the code before unlocking. In one embodiment, the smart locker 204a may include a keypad 222 that operates as a user interface for the user to enter the PIN previously downloaded via the mobile kiosk 202a, thereby allowing the user to store the mobile kiosk 202a (i.e., mobile device on which a mobile kiosk app is operating) in the smart locker 204a, while still allowing for the user to unlock the smart locker 204a.

A variety of different options for controlling the smart locks 206 may be utilized. As an example, the PIN may be a code that the user enters. However, other options for creating or selecting a PIN may be utilized, including assigning a PIN to the user, using a unique mobile device ID (e.g., subscriber identity module (SIM), mobile identification number (MIN)), using a user account number, or using another identifier. In one embodiment, the user may not be issued the PIN and the management server may communicate the PIN along with a network address or other identifier of the smart lock via the mobile kiosk that, in turn, communicates the PIN to the smart lock. Alternative ways of providing a user with a PIN may be utilized.

In providing for a substantial kiosk functions, the mobile kiosk 202a may be configured (i) to store available lockers at a locker bank from data received from the management server and/or data collected by the mobile kiosk 202a (e.g., polling status from each of the smart lockers 204), (ii) to enable a user to select a locker type and term of rental to rent the smart locker 204a, (iii) to select a locker to assign to the user, (iv) to determine a PIN or enable a user to submit a PIN to lock and unlock the smart locker 204a, (v) to receive and store locker status information, (vi) to receiving status update information of all of the locally available lockers from the management server 210 to enable the mobile kiosk 202a to operate relatively autonomously or independent of the management server in a distributed kiosk management configuration, which is operating as a central controller for at least a portion of locker banks being managed by an operator.

As a result of providing more significant kiosk features in the mobile kiosk, if the lockers (or other securable devices) are positioned in a geographic location in which no or limited mobile communications are available, then users with a mobile kiosk app may still be able to utilize the lockers. That is, if the mobile device is out-of-range or have no or weak communications signaling with a mobile communications network or even WiFi network, then a user with a mobile kiosk still may be able to rent a locker. In one embodiment, the user may have to have a valid credit card, debit card, prepaid card, or other approved payment means pre-approved by an operator as the mobile kiosk may update the rental information after the rental transaction is complete. In one embodiment, a stand-alone device, such as a room safe, may operate by a mobile kiosk communicatively connecting to a smart lock of the stand-alone device so as to receive status from the lock. The mobile kiosk could be preloaded with payment, an application capable of self-managing a transaction, or other information that allows for the mobile kiosk to perform a rental transaction independent of the management server if the mobile device on which the mobile kiosk is operating is out of range of a cellular or Internet connection or otherwise prevented from communicating with the management server.

Figure 3:
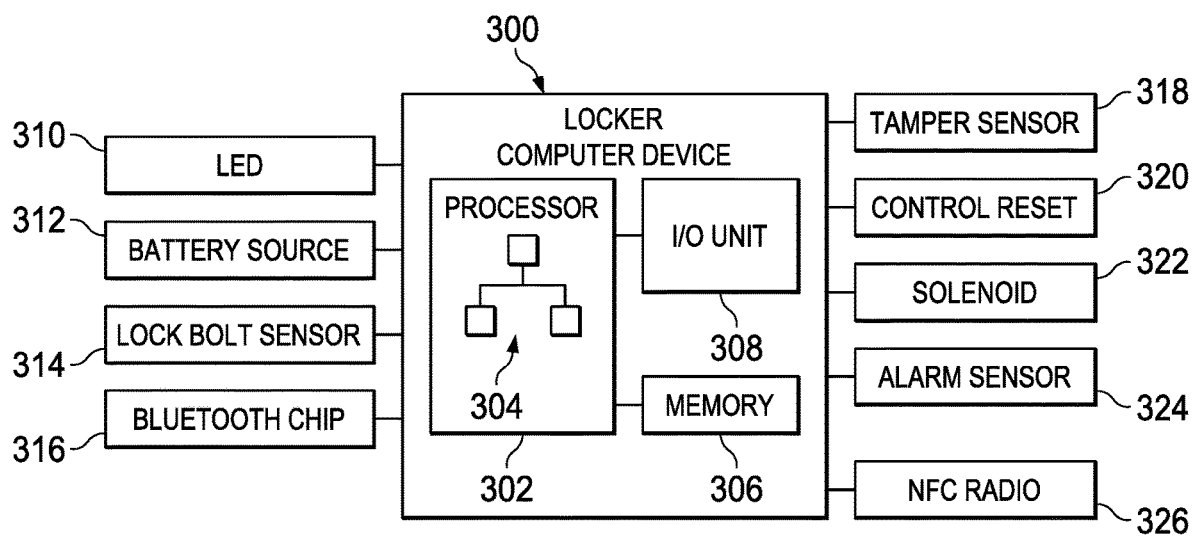
FIG. 3 is an illustration of an illustrative locker computer device and associated electronics that enables the locker computer device to provide for a "smart locker;"

With regard to FIG. 3, an illustration of an illustrative locker computer device 300 and associated electronics, at least in part, enables the locker computer device 300 to provide for a "smart locker" is shown. In one embodiment, the locker computer device 300 and associated electronics may include a printed circuit board (PCB), wiring, and other electronic devices. The locker computer device 300 may include a processing unit 302 that executes software 304. The software 304 may facilitate locking and unlocking a locker in response to verifying a code and/or other information. The processing unit 302 may be in communication with a memory 306 and input/output (I/O) unit 308 for communicating with sensors, network communications devices, if not incorporated into the I/O unit 308, and the like.

The locker computer device 300 may be in communication with a number of devices, including an illumination device 310, such as a light emitting diode (LED), that may be used to indicate lock/unlock status and other statuses of other conditions. In one embodiment, the illumination device 310 may include multiple illumination devices, where two LEDs may produce the following indicators as shown in TABLE I:

TABLE I

Indicators of Illumination Devices

| LED 1 INDICATORS | LED 2 INDICATORS |
| --- | --- |
| Green - unrented | Green - unlocked |
| Red - rented | Red - locked |
| Flashing White - waiting for RFID | |
| No light - out of service or light failure | |
| Flashing green - rental extended; door open or unlocked | |

It should be understood that additional and/or alternative number of LEDs that produce the same or different indicators may be used. A battery source 312, such as a lithium ion battery or rechargeable battery along with a photovoltaic device, may be used to power the locker computer device 300. A lock bolt sensor 314 may be used to sense position of a lock bolt of a securable device, such as an electronic locker. A Bluetooth chip 316 may be used to enable the locker computer device 300 to communicate with a mobile device using a Bluetooth communications protocol, as understood in the art. A tamper sensor 318, such as motion and/or light sensor, may be configured to sense whether a securable device is tampered with while the securable device is in a locked state. A control reset 320 may be configured to enable an operator to perform a "hard" reset of the locker computer device 300 during maintenance or resetting due to an error condition.

A solenoid 322 may be an electromechanical mechanism that may be engaged and disengaged to lock a securable device in response to the locker computer device 300 applying and removing an electric charge. An alarm sensor 324 may be configured to sense an action, such as a locker door being opened when the locker computer device 300 is in a lock state. An NFC radio 326 may be configured to communicate with another NFC device, such as a mobile device configured with an NFC radio, for use in exchanging a lock/unlock code, access code, payment code, personal information, mobile device information, or otherwise. It should be understood that the configuration shown is illustrative and that additional and/or alternative configurations may be utilized. For example, the components may include additional, alternative, or fewer sensors. In one embodiment, a passive RFID reader may be included with the locker computer device 300 for reading RFID signals of RFID signal generators that may be used to unlock and lock the securable device. Still yet, some of the components shown may be integrated into the locker computer device 300 or positioned on a PCB of the locker computer device 300.

In operation, the locker computer device 300 may update a local data structure stored in the memory 306 that indicates whether the locker is available based on a lock status of the locker. The locker computer device 300 may also transmit, to a management server 200 (FIG. 2A), a message indicating that the locker has been unlocked and locked. The locker computer device 300 may also include transmitting via the Bluetooth chip 316 to a mobile kiosk operating on a mobile device that was used to rent the locker updates of information (e.g., lock status, door position status, alarm status, or otherwise) processed by the locker computer device 300. The NFC radio 326, which may alternatively be a passive NFC reader, may receive NFC actions from a mobile device that includes an NFC radio. In one embodiment, a passive RFID reader (not shown) may receive a signal to turn on after a button has been pressed on a keypad (not shown) to "wake up" the passive RFID reader. The mobile kiosk may be configured to utilize a local communications channel as desired by the user.

In one embodiment, the locker computer device 300 may contains one or more printed circuit boards (PCBs) with circuitry and electronic components that provide for a variety of functions and features, such as those shown in FIG. 3. The locker computer device 300 may be configured to communicate signals to an electronic lock 206a (FIG. 2A), for example, to either lock or unlock the smart locker 204a. The PCBs may be installed in an individual locker and communicate with a mobile kiosk when communicating with the management server 210 (FIG. 2A). In one embodiment, individual PCB boards may be installed in lockers and be daisy chained to a "motherboard," where the motherboard includes components, such as those shown in FIG. 3.

Figure 4:
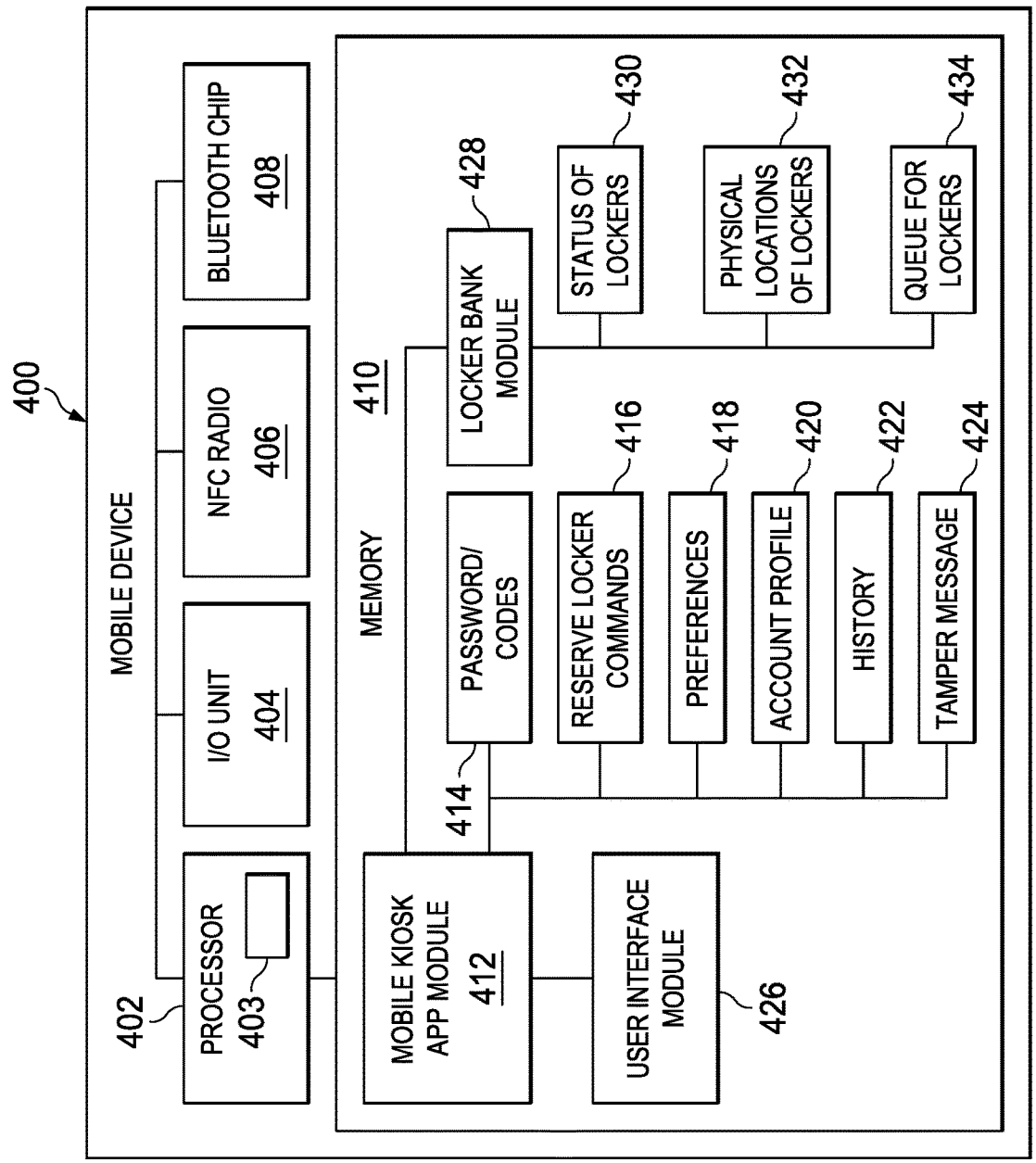
FIG. 4 is an illustration of an illustrative mobile device configured to operate as a mobile kiosk for controlling smart lockers.

With regard to FIG. 4, an illustration of an illustrative mobile device 400 configured to operate as a mobile kiosk for controlling smart lockers is shown. The mobile device 400 is shown to include a processor 402 that executes software 403. The processor 402 may be in communication with an input/output (I/O) unit 404, NFC radio 406, Bluetooth chip 408, and a number of other electronic devices, such as an electronic display, as understood in the art. The software 403 may be configured to execute a mobile kiosk app, as understood in the art, that may be configured to cause the mobile device 400 to become a mobile kiosk, as further described herein. The mobile kiosk application, which essentially converts the mobile device into a mobile kiosk that operates as a bridge between one or more smart lockers and a management server located on a communications network as described with regard to FIG. 2A, may be utilized by a user of the mobile device 400. Rather than being an app, a website that may be operated by a mobile browser may alternatively be utilized.

The processor 402 may further be in communication with a memory 410 that is configured to store software and data associated with the mobile kiosk. As shown, the memory 410 may be configured to store a mobile kiosk app module 412 that, when executed by the processor 402, creates and manages data used to support the mobile kiosk module 412. The data may include a number of different data elements that are used by the mobile kiosk to control or otherwise manage or track operation of the mobile kiosk app module 412 when accessing or controlling individual smart lockers. The data may include, but not be limited to, password/codes 414 (e.g., 4-digit personal identification number (PIN)), reserved locker commands 416, preferences 418 (e.g., short-range communications preferences), account profile 420, history 422, and tamper message 424. Each of the data elements 414-424 may be particular to a user of the mobile device who desires to or has rented securable devices, such as smart lockers. In one embodiment, the mobile kiosk apps module 412 may be configured to display some or all of the data elements 414-424 to the user via a user interface module 426 that generates one or more graphical user interfaces for the user to utilize in accessing and controlling the securable devices.

The software 403 being executed by the processor 402 may further be configured to execute a locker bank module 428 that operates to track data and/or information associated with one or more locker banks with which the mobile device 400 may communicate. The locker bank module 428 may operate to store and retrieve data being stored in the memory 410, where the data may include status of lockers data 430, physical locations of lockers 432, and queue for lockers 434. The status of lockers data 430 may include a list or matrix of status identifiers as to whether lockers within a locker bank or otherwise are available or currently being rented. The status of lockers data 430 may also include timers associated with each of the lockers that are currently being rented, so that a user may view the timers to determine when a particular locker or any locker within a locker bank will become available. The physical locations of lockers 432 may list a geographic location of locker banks to assist a user of the mobile device 400 to determine where he or she may find an available locker. The queue for lockers data 434 may enable a user to be listed in a queue for a next available locker within a locker bank. In one embodiment, the queue for lockers data 434 may show a list of a number of different people waiting for lockers at a particular locker bank or within a geographic area. In one embodiment, the locker bank module 428 may be configured to automatically notify the user of the mobile device 400 when a next locker is to become available and an approximate time of the availability. Additional and/or alternative data may be associated with the locker bank module 428 to assist the mobile kiosk app module 412 in managing locker banks.

In operation, the mobile kiosk app module 412 may be configured to provide a number of different access and control functions, including unlock/lock commands that are communicated to a smart locker to unlock and lock the smart locker, locker reservation commands, passwords/codes function that enables the user to create or alter passwords or codes that are used to lock and unlock a smart locker, or otherwise. The access and control functions may be accessible via a user interface that is managed by the user interface module 426. The user interface module 426 may provide for alternative and/or additional functionality used on accessing and controlling individual smart lockers or securable devices along with providing functions associated with locker banks (e.g., managing a queue, status of lockers within a locker bank or geographic region with multiple locker banks).

Figure 5:
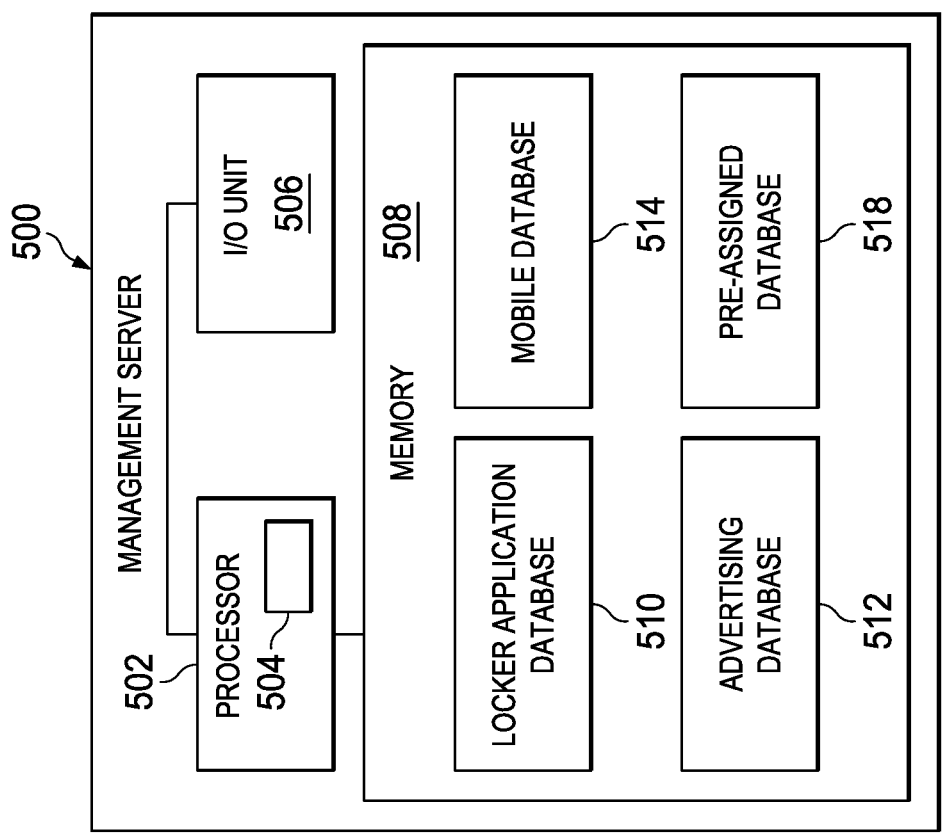
FIG. 5 is an illustration of an illustrative management server configured to communicate with mobile kiosks to manage lockers in a smart locker system.

With regard to FIG. 5, an illustration of an illustrative management server 500 configured to communicate with mobile kiosks (not shown) to manage lockers in a smart locker system is shown. The management server 500 may be the same or similar to the management server 200 shown in FIG. 2A. The management server 500 may be implemented as or within a server farm including multiple machines as opposed to a single server. As shown, the management server 500 may include a processor 502 that executes software 504, input/output unit 506 used to communicate data over a communications network (not shown), and memory 508 configured to store one or more databases. The I/O unit 506 may include one or more network interface cards (NICs), as understood in the art. As illustrated, the memory 508 may include a locker application database 510, an advertising database 512, a mobile database 514, and a pre-assigned database 518.

The locker application database 510 may store information, such as user pin codes, passwords, usage data, access records, pricing algorithms, and RFID codes. The information stored in the locker application database 510 may be encrypted and received from mobile kiosks, and may be used to ensure that the mobile kiosks that are being used to access or near smart lockers are synchronized. An advertising database 512 may be configured to store advertisements paid by third-party advertisers, and the advertisements may be communicated to mobile kiosks operating on mobile devices of users when using the mobile kiosk app or website. The mobile database 514 may store any information that is input into a mobile device by a user operating a mobile kiosk, where such information may include encrypted payment information, account details, rental history, and the like.

Although not limited by any particular theory of operation, in certain embodiments, the management server 500 may be configured to enable the mobile kiosks to access one of multiple lockers by the management server 500 being programmed to synchronize to an existing pre-assigned database 518 of stored user information, associating that stored profile to a user with one of the locker(s) so that the user is authorized to access the assigned locker. The pre-assignment process allows for an extra layer of authentication that is directly associated with the location or facility that the electronic locker system 100 is positioned. In one example, a user may enter his or her flight confirmation number into a mobile kiosk to unlock/lock one of the lockers smart lockers available to the mobile kiosk. By providing the flight confirmation number, the TSA and airport security can ensure that a user's belongings are stored while present at an airport. Thus, the system ensures that the depositor of an item in a smart locker is also the recipient. Utilizing the smart locker system described herein, the user can rent a smart locker through a mobile kiosk using a smart phone or tablet.

Figure 6:
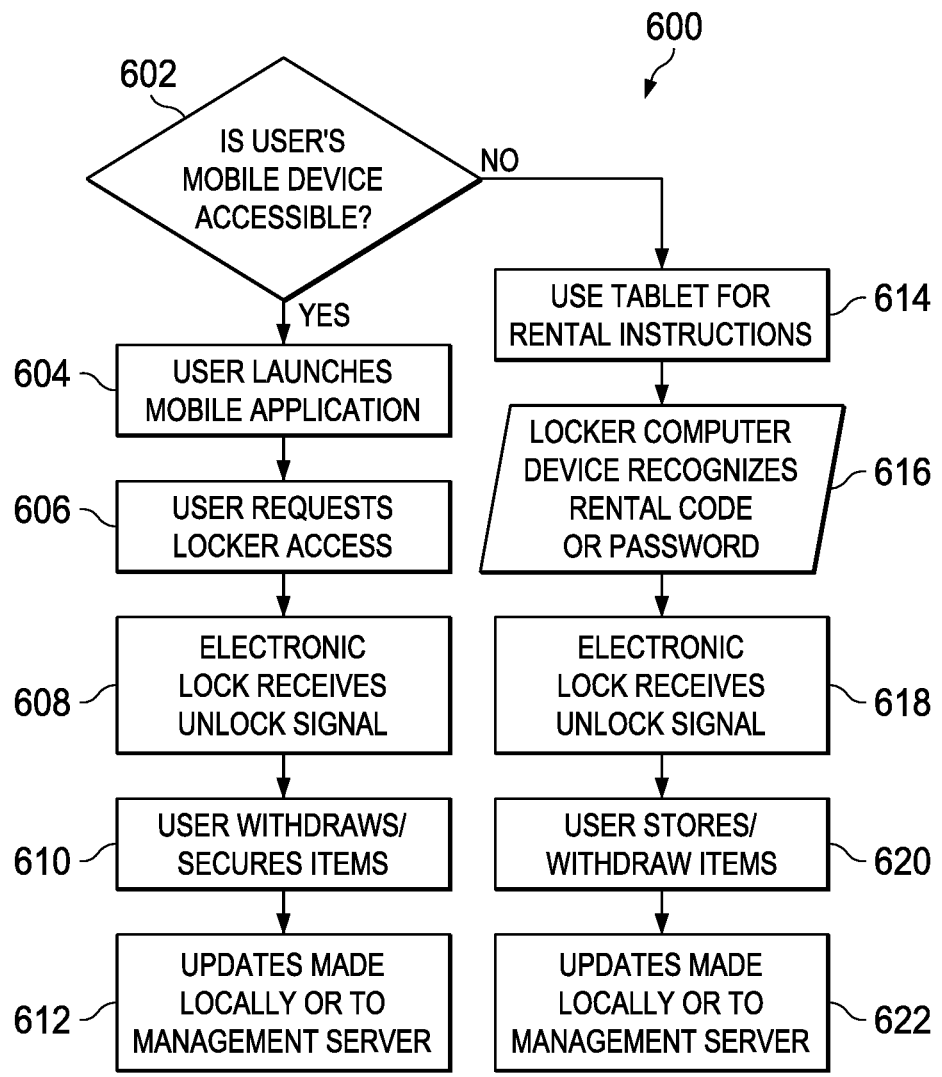
FIG. 6 is a flow diagram of an illustrative high-level process for a user to secure or withdraw items smart locker or access other securable devices configured with a smart lock.

With regard to FIG. 6, a flow diagram of an illustrative high-level process 600 for a user to secure or withdraw items from a smart locker or access other securable devices configured with a smart lock is shown. The process 600 provides an example of a user flow using either a mobile kiosk operating from a personal mobile device or a tablet that may be available at the securable devices that is determined by the user at step 602. At step 604, a user may launch a mobile kiosk app or access a website that provides the same or similar functionality as a mobile kiosk app. If the user has not already signed up for an account or otherwise registered with a mobile kiosk and/or management server, the user may be requested to enter payment information into the mobile application to enable locker access via the mobile kiosk. At step 606, a user may request access to a smart locker via the mobile kiosk. In one embodiment, the mobile kiosk communicates the request to a management server, and, upon verification by the management server, sends a lock/unlock command to the smart locker. At step 608, an electronic lock of the smart locker receives an unlock signal to cause the electronic lock to transition from a locked state to an unlocked state. After a user deposits or withdraws items from the smart locker or otherwise access the smart locker, the locker computer device may communicate a status signal to the mobile kiosk to update a data structure at the mobile device and/or at the management server via the mobile device operating the mobile kiosk app. The status signal may include a lock/unlock state signal, door open/close signal, locker empty signal (if a compartment sensor exists at the smart locker), or any other status signal.

As an alternative to the user utilizing a mobile kiosk app on a mobile device, the user may use a tablet or LCD monitor at step 614. In one embodiment, a PIN code or password used to access the smart locker from a mobile device may be stored in the management server, and in the case that the mobile device is not accessible (e.g., because the mobile device is in the smart locker), the PIN code or password may be accessible via the tablet. At step 616, the locker computer device, such as a tablet, may recognize a rental code (e.g., PIN code) or password, and the electronic lock receives an unlock signal via the tablet at step 618 to cause the electronic lock to transition from a lock state to an unlock state. At step 620, the user may access, store, or withdraw items from the smart locker. At step 622, the smart locker may communicate status data to the mobile kiosk, in this locker computer device, to cause the mobile kiosk to update data records and/or communicate the status data of the smart locker to the management server to update records being managed thereby.

Figure 7A:
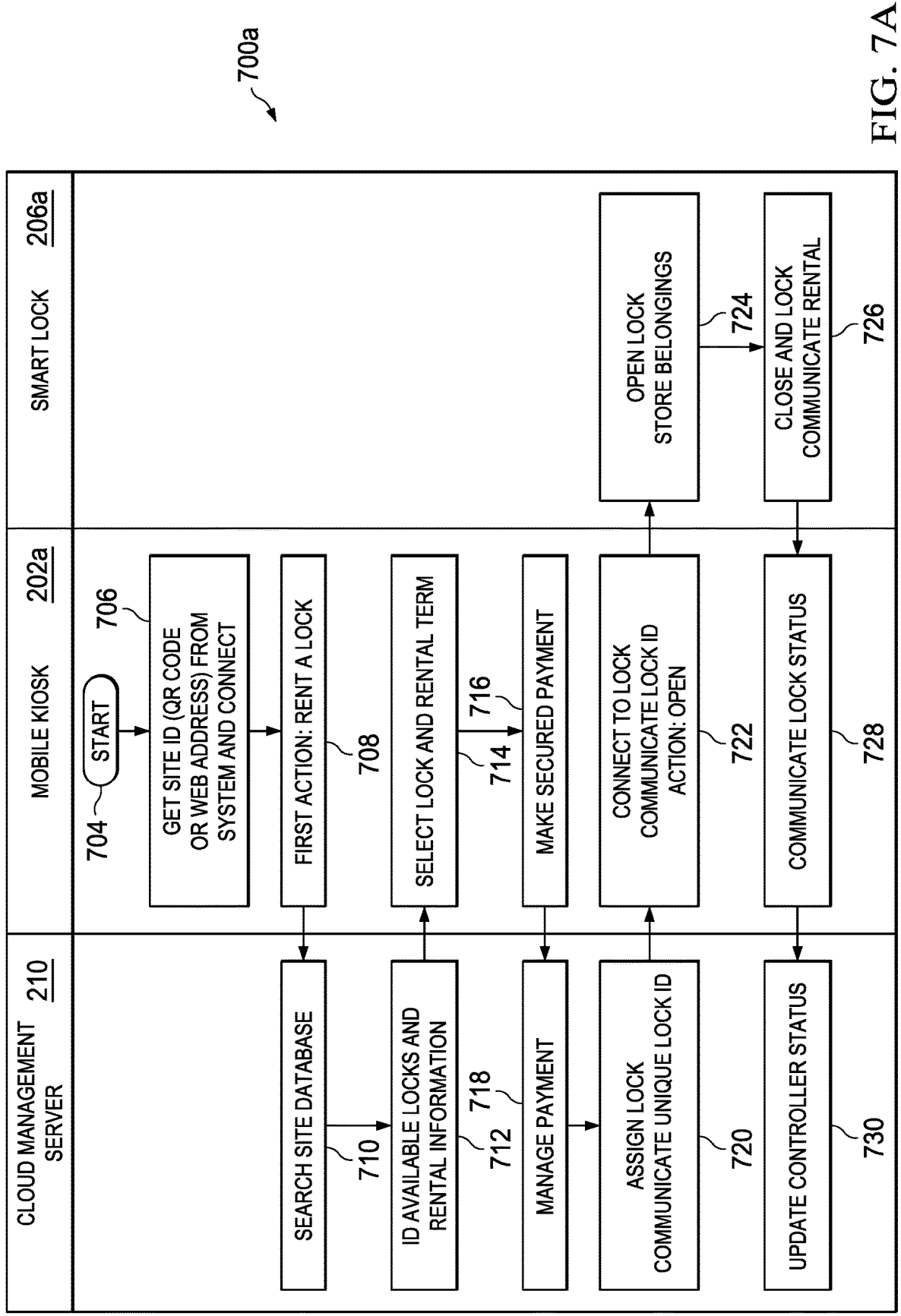
FIG. 7A is an interaction diagram of an illustrative environment in which communications between the mobile kiosk (FIG. 2A), cloud management server, and electronic lock may enable a user of the mobile kiosk to rent a securable device.

With regard to FIG. 7A, an interaction diagram of an illustrative environment 700a in which communications between the mobile kiosk 202a (FIG. 2A), cloud management server 210, and electronic lock 206a of a smart locker 204a enable a user of the mobile kiosk 202a to rent a smart locker is shown. The environment 700a is shown to include an illustrative process 702 that starts at step 704 at the mobile kiosk 202a. At step 706, the mobile kiosk 202a may receive a site ID or location at which securable devices are located. In receiving a site ID, the mobile kiosk 202a may use a camera or other electronic sensor of a mobile device on which the mobile kiosk 202a is operating to image a QR code or other indicia, interface with an NFC tag, communicating using a short-range communications path that includes an indicia or signal of a physical address, network address, or other ID type from the smart locker, and connect with the cloud management server 210 via a communications network. In an alternative embodiment, the QR code or other indicia may direct the mobile device to a network address that enables a mobile app configured as the mobile kiosk 202a to be downloaded to the mobile device. In connecting with the cloud management server 210, a mobile device may access a website or mobile app each configured to operate as a mobile kiosk, and execute machine-readable instructions to communicate information to the cloud management server 210. At step 708, the mobile kiosk 202a may receive a request from a user to perform a first action, in this case, to rent a lock. At step 710, the mobile kiosk 202a communicates a query to the cloud management server 210 to perform a search in a site database inclusive of information associated with locks associated with the site ID. At step 712, the cloud management server 210 may identify available locks and rental information associated with the available locks from the site database for presentment to the user of the mobile kiosk 202a.

At step 714, the user may view the available locks and rental information, and select a lock and rental term, where the rental term may include an amount of time (e.g., two hours, four hours, full day, etc.) for which the user desires to rent the lock. At step 716, the user may make a secured payment to rent the selected lock for the selected rental term, and communicate a request for the lock rental to the cloud management server 210 to make a payment based on the desired lock and rental term. It should be understood that renting a lock may include renting a lock associated with a locker system, mobility device, or other securable device. The payment may be managed by the cloud management server 210 at step 718. Once payment has been approved and verified by the cloud management server 210, at step 720, the cloud management server 210 may assign a lock to the user and communicate a unique lock ID to the mobile kiosk 202a. In response to receiving the assigned lock and unique lock ID from the cloud management server 210, the mobile kiosk 202a may communicate with the smart lock 206a utilizing the lock ID and communicate an action, such as "open" or "unlock."

In response to the smart lock 206a receiving the unique lock ID and "open" or "unlock" action request, the smart lock 206a may unlock at step 724 to enable the user of the mobile kiosk 202a open the smart lock 206a and store, remove, or otherwise access his or her belongings in the case of the lock being positioned on a locker. At step 726, the user may close and lock the smart lock 206a utilizing a user interface (e.g., keypad) in communication with the smart lock 206a, and the smart lock 206a may communicate to the mobile kiosk 202a an updated status, such as "rental initiated," "locked," and/or other status update. The mobile kiosk 202a, may, in return, communicate the status of the smart lock 206a to the cloud management server 210, which, in response to receiving the updated smart lock 206a status, update the site database. By using the cloud management server 210 to operate as a central controller for all mobile kiosks 202 (FIG. 2A), multiple mobile kiosks may be utilized, and accurate knowledge of lock availability may be provided.

It should be understood, however, that alternative configurations of the illustrative process 702 may be provided. For example, the mobile kiosk 202a may notify the cloud management server 210 of its geographic location, and the cloud management server 210 may communicate data of the smart lock 206a at or near the mobile kiosk 202a so that the mobile kiosk 202a may provide a unique lock ID independent of the cloud management server 210.

As a result of utilizing smart lockers that are non-networked, such as being networked in a cluster of networked lockers, rather than an operating having to utilize locker bank configurations that are configured in rows or columns, alternative configurations of lockers may be utilized. For example, individual lockers may be attached to a bank of lockers or otherwise place in close proximity as wiring harnesses and other conventional configuration features may be eliminated. The addition or subtraction of smart lockers may automatically be detected, assigned an ID (or an ID may be deleted if a locker is removed), and update any data structures to reflect a change in the configuration of a locker bank. In automatically identifying new or removed lockers, each of the lockers may have its own unique ID and/or network address that may be programmed during manufacturing, and the unique ID and/or network address can be identified by a mobile kiosk or provisioned during installation and stored by a management server.

Moreover, as a result of utilizing smart lockers that are non-networked and utilize mobile kiosks for rental and control functionality, at least in part, securable devices in forms that are other than lockers may be utilized. As non-limiting examples, such other uses may include mobility devices, such as carts, wagons, scooters, bicycles, automobiles, and boats. Other non-limiting, non-mobility uses may include mailboxes, delivery boxes, rack equipment (e.g., bicycle racks with smart locks, ski racks with smart locks, etc.), doors of storage units, safes in hotel rooms, doors of short-term or long-term living quarters, and so on. The securable devices may be integrated into the various uses or be add-on devices. The mobile kiosks may provide access to these various smart locks, and enable a management server to track usage of the various devices (e.g., mobility devices, racks).

Because the smart locks may be configured to use little power by using one or more local (i.e., short-range) communications protocols (e.g., Bluetooth, WiFi, RFID, NFC, etc.) and not have to communicate via a long-range communications network (e.g., mobile communications network, wide area network (WAN), such as the Internet), or local communications network on a continuous basis, power to the smart locks may be provided in the form of batteries without having power from a power grid. Rechargeable batteries and solar cells to recharge the rechargeable batteries may be used, for example. Moreover, because the smart locks may utilize local communications protocols and rely on mobile devices to provide for mobile kiosks that enable users to rent and/or access the smart locks and items (e.g., lockers, mobility devices, etc.), the smart locks may be utilized in ways heretofore not possible. And, because mobile kiosks may be used in conjunction with the smart locks, an operator may be able to manage the smart locks and devices (e.g., mobility devices) associated therewith and receive payment for rental of the devices on which the smart locks are securing in locations in which power and communications would be difficult to provide. One example of using smart locks includes retrofitting existing mailboxes at a postal or mailbox rental store because battery powered smart locks retrofitted onto walls of mailboxes is easy as no grid power or networking would be needed. Other examples of retrofitting securable devices with mechanical or "dumb" electronic locks are contemplated.

Figure 7B:
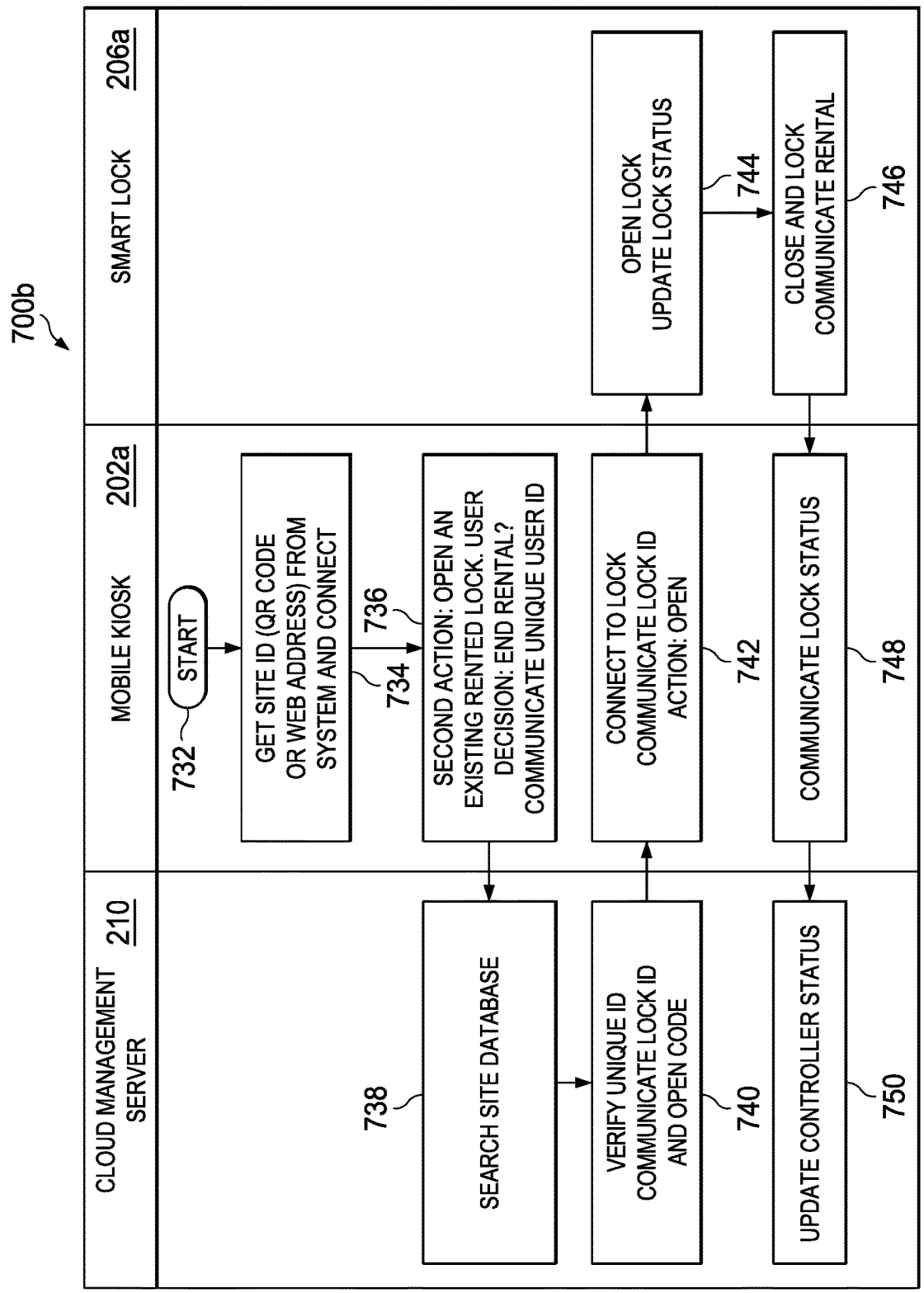
FIG. 7B is an interaction diagram of an illustrative environment in which communications between the mobile kiosk, cloud management server, and electronic lock may enable a user of the mobile kiosk to perform second actions (e.g., extend rental, end rental) with a rented securable device.

With regard to FIG. 7B, an interaction diagram of an illustrative environment 700b in which communications between the mobile kiosk, cloud management server, and electronic lock may enable a use of the mobile kiosk to perform second actions (e.g., extend rental, end rental) with a rented securable device is shown. The process 700b may start at step 732. At step 734, the mobile kiosk and 202a may get a site ID from imaging a QR code or other indicia located at a set of securable devices (e.g., locker bank). The site ID may be in the form of a web address or be any other identifier unique to a set of securable devices, such as a smart locker system, and connect with the cloud management server 210 via a long-distance communications path. At step 736, the user may perform a request to perform a second or subsequent action with the rented securable device. The second action may include opening an existing rented lock, make a decision to extend the rental, or end a rental. The mobile kiosk 202a may communicate a unique user ID and/or PIN to the cloud management server 210.

At step 738, the cloud management server 210 may search a site data repository, such as a database, being operated by or in communication with the cloud management server 210, and configured to store usage information of smart locks that are being rented or available for rent. At step 740, the cloud management server 210 may verify the unique ID and communicate a lock ID and open code to the mobile kiosk. The lock ID may be a unique ID associated with a smart lock, and the open code may be a code that, when received by the smart lock, cause the smart lock to unlock. In one embodiment, the unique ID may change after each transaction to ensure the security of the locker. In one embodiment, the open code may be the PIN associated with the user and previously stored by the smart lock. Alternatively, the open code may be a command that instructs the smart lock to unlock or open. At step 742, mobile kiosk 202a may connect to the smart lock 206a via a local or short-range communications path, and communicate the lock ID unique to the smart lock 206a and action command, in this case open or unlock.

At step 744, the smart lock 206a may unlock or open the lock 206a, and generate an updated lock status (e.g., unlock). At step 746, the smart lock 206a may be closed and locked, and a communication of the rental status may be made back to the mobile kiosk 202a via the local communications path. At step 748, the lock status may be communicated from the mobile kiosk 202a to the cloud management server 210, which, in response, may update the status of the smart lock 206a in a data repository at step 750. In one embodiment, each time the smart lock 206a is engaged or performs an action, the smart lock 206a may communicate a status update to the mobile kiosk 202a to cause the mobile kiosk 202a (i) to update data records being stored thereby and (ii) to communicate the status update to the cloud management server 210 for updating records being managed thereby.

Figure 8A:
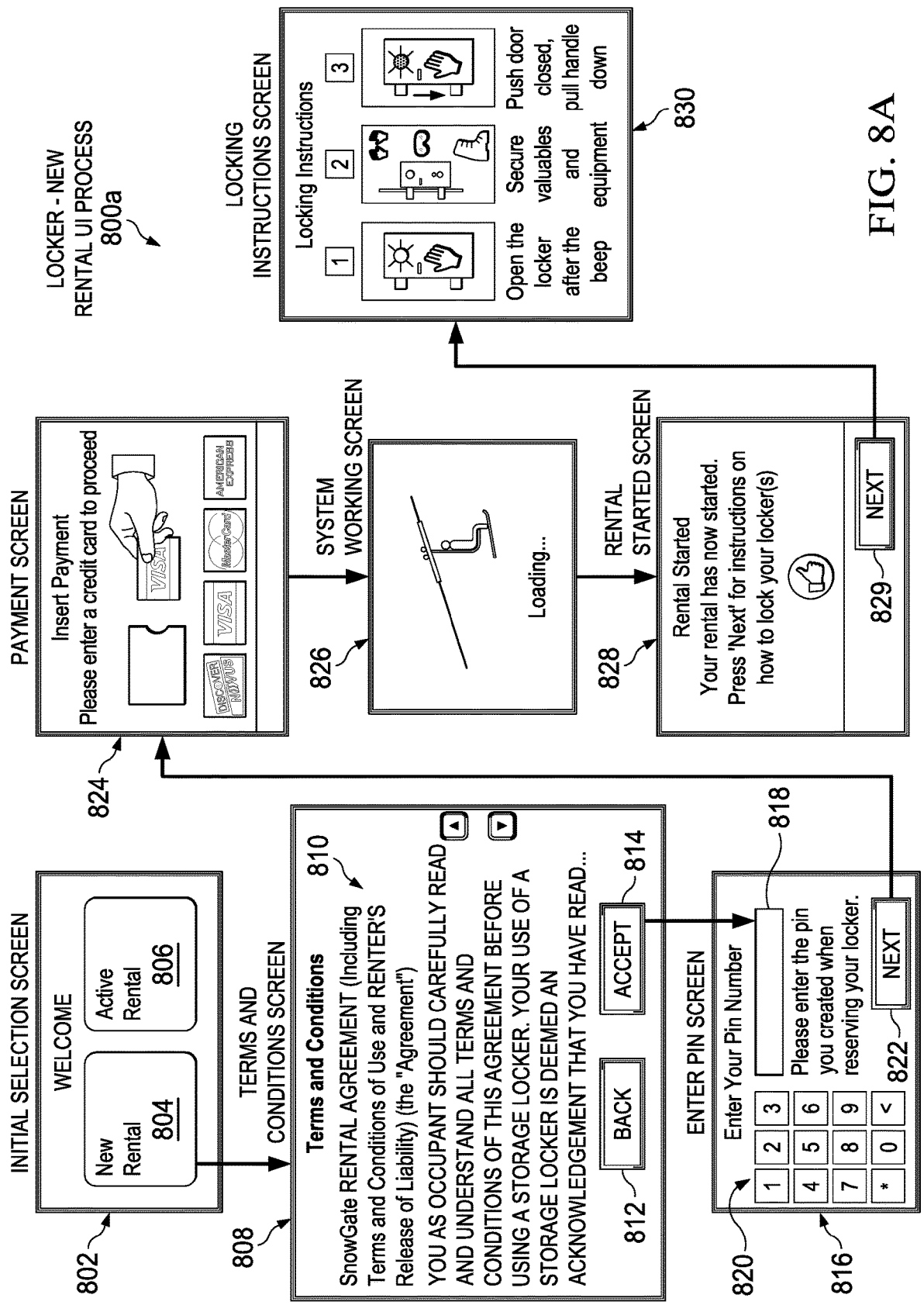
FIGS. 8A-8C are screenshots of illustrative user interfaces that support processes for establishing a new rental, extending rental, and ending rental processes of securable devices, respectively.
Figure 8B:
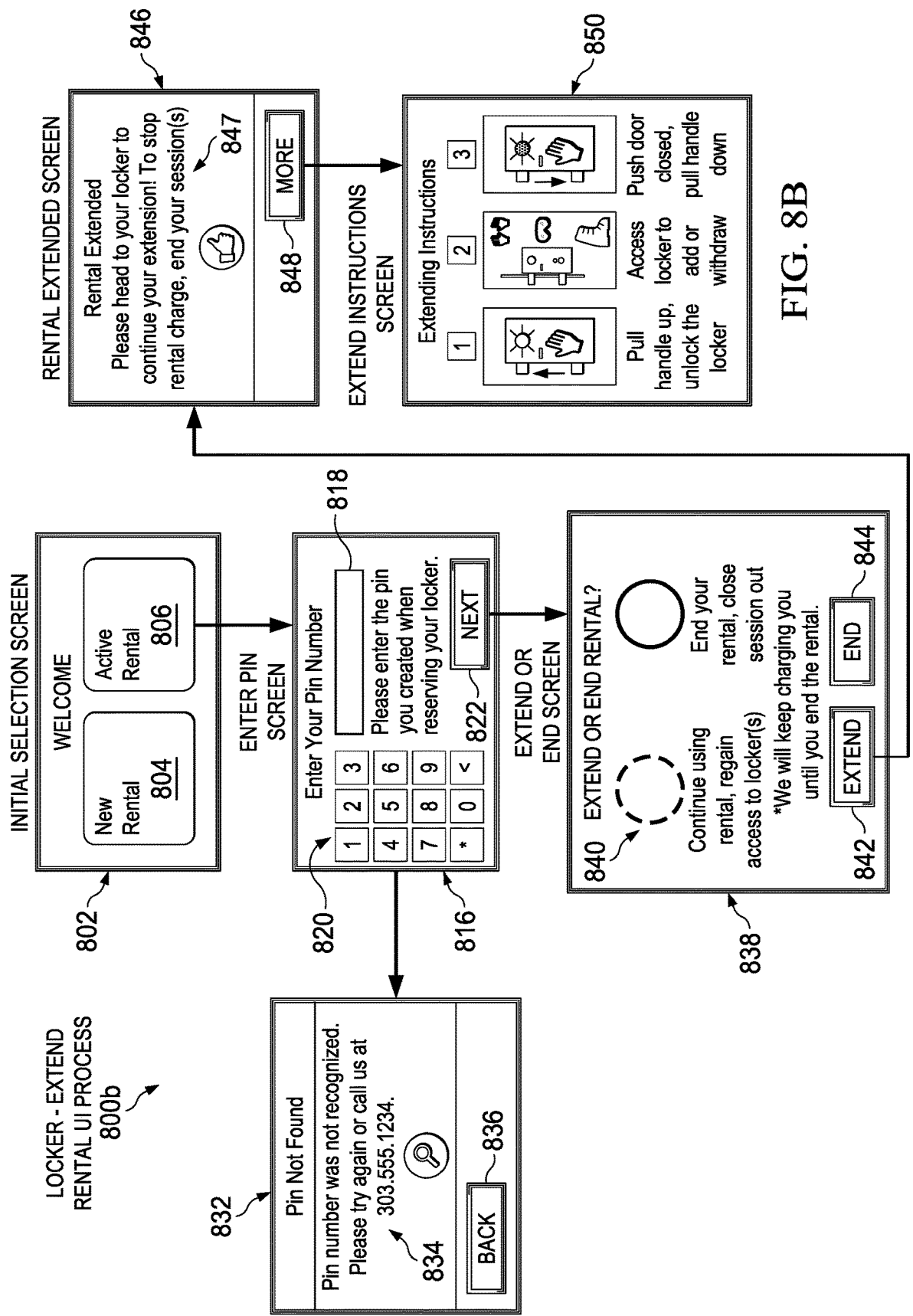
Figure 8C:
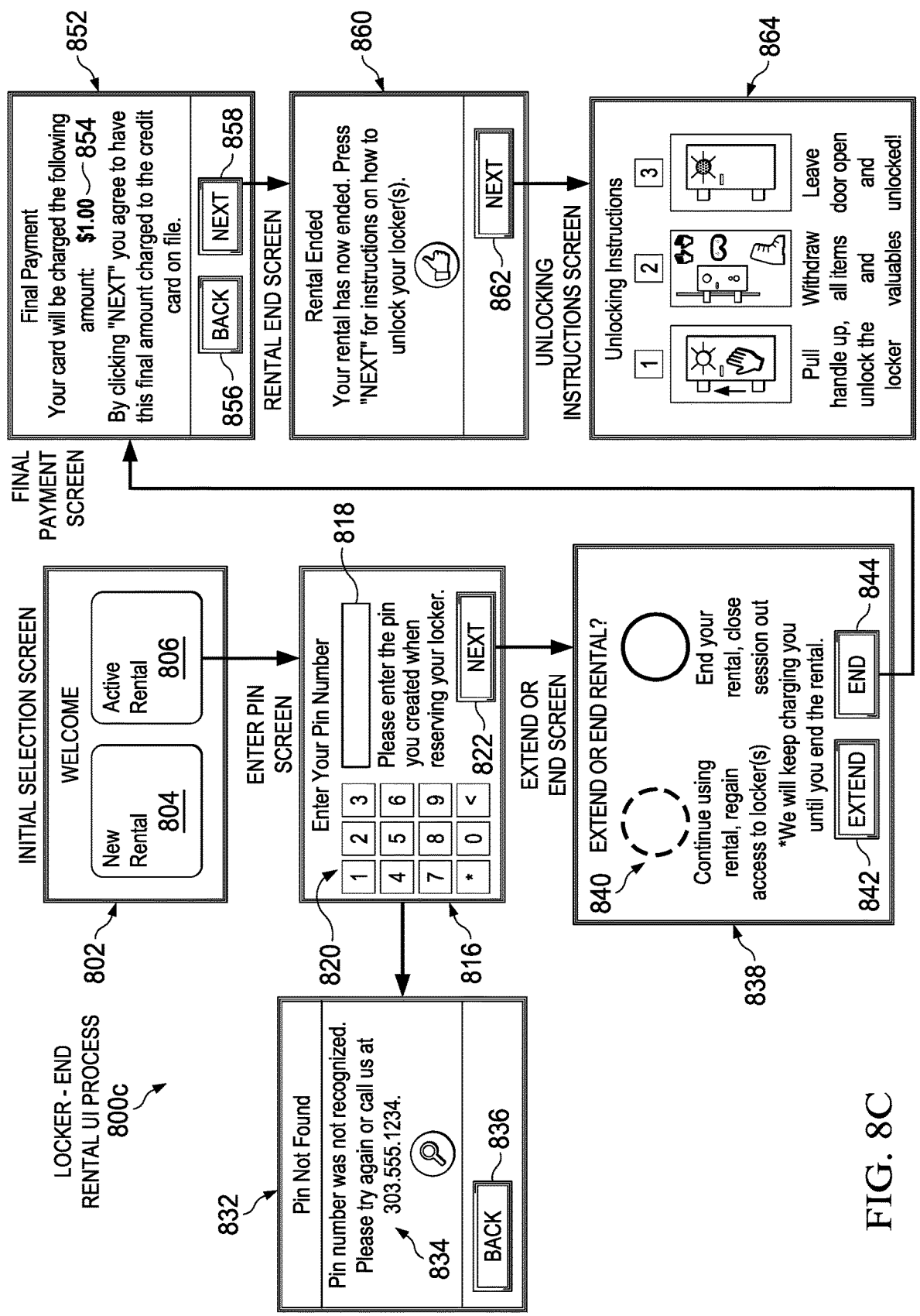

With regard to FIGS. 8A-8C, screenshots of illustrative user interfaces that support processes for new rental, extend rental, and end rental processes of securable devices, respectively, are shown. These screenshots and processes provide for rental of lockers, but it should be understood that these screenshots and processes may be configured to rent or access any other type of securable device, such as mobility devices, mailboxes, delivery boxes, mobility devices, and so forth.

With regard to FIG. 8A, an illustration that includes a number of user interfaces for supporting a new rental process 800a is shown. The screen shots and new rental process 800a may start at an initial selection screen shown as user interface 802 on which a "new rental" soft-button 804 and "active rental" soft-button 806 are presented to a user of a mobile kiosk. In response to the user selecting the "new rental" soft-button 804, the process continues at screenshot (step) 808 that presents terms and conditions 810 to the user so that the user is presented with requirements for renting a securable device, in this case a locker. If the user does not agree with the terms and conditions 810, the user may select a "back" soft-button 812 to return to the initial selection screen 802. Alternatively, if the user accepts the terms and conditions 810, the user may select an "accept" soft-button 814. In response to the user selecting the soft-button 814, the process continues at user interface 816 in which the user is presented with a field 818 in which a PIN may be displayed in response to the user entering a PIN on a soft-keypad 820 that may be displayed on a touchscreen or use a physical keypad if the user has a mobile device inclusive of a physical keypad. The PIN may be a 4-digit or other length PIN that the user creates. Alternatively, the mobile kiosk or management server may create a PIN for the user.

After the user enters his or her PIN (or a PIN is created for the user), the user may select a "next" soft-button 822, which causes the user interface 816 to transition to user interface 824 that requests payment from the user. If the user is using a mobile kiosk configured on his or her mobile device (e.g., smart phone), then the user may type a bankcard (e.g., credit card) number, expiration date, and, optionally, security code into another user interface (not shown) into the user interface or otherwise access payment information on his or her mobile device from which the mobile kiosk may access the payment information for confirmation. Alternative forms of payment may be utilized, as previously described. Screenshot 826 may present information indicative of the mobile kiosk confirming payment. In one embodiment, the mobile kiosk confirms payment with a management server located on a communications network, as previously described, that performs a credit card, debit card, or other payment type transaction.

Upon completion and success of payment, the user interface 828 may indicate that rental has started for the user. In one embodiment, if a securable device is selected for the user by a management server or mobile kiosk, then an identifier of the securable device that was selected for the user may be displayed in the user interface 828. In one embodiment, an illumination device may be illuminated and/or an audible device may be engaged to produce an sound or otherwise indicate to a user which securable device to engage. In an alternative embodiment, the user may proceed to a set of securable devices, and enter his or her PIN into one of the securable devices, which may cause the securable device to communicate with the mobile kiosk via a local communications path to communicate a unique identifier associated with the selected securable device (e.g., network address) along with the PIN, so that the mobile kiosk and management server may associate the PIN and rented securable device for management of the securable device. The user may select a "next" soft-button 829 to cause the mobile kiosk to display user interface 830 that instructs the user provides locking instructions for the user.

With regard to FIG. 8B, an illustration that includes a number of user interfaces for supporting an extend rental process 800b is shown. The screenshots and extend rental process 800b is shown to include the screenshot 802 that provides for the "new rental" soft-button 804 and "active rental" soft-button 806. To extend a current locker rental, the user selects the "active rental" soft-button 806. In response, screenshot 816 is shown, where the user may enter his or her PIN into the keypad 820. If a determination that the PIN is not found by a cloud management server or the mobile kiosk, then the process 800b may display user interface 832 to provide a message 834 that the PIN was not recognized along with other information for assistance by an operator. A "back" soft-button 836 may be presented for the user to select to return back to user interface 816. If the PIN is recognized, then the process 800b may continue and display user interface 838, where a message 840 may notify the user that he or she may (i) continue with the rental or access a locker or other securable device currently being rented, or (ii) end the rental and close a session out. If the user decides to extend the current rental, then the user may select an "extend" soft-button 842. Otherwise, if the user decides to end his or her current rental session, then the user may select an "end" soft-button 844. As shown, the user has decided to extend the rental, and the process 800b continues and displays screenshot 846. The screenshot 846 may provide instructions 847 to the user to indicate that he or she may access the locker while the rental is extended. A "more" soft-button 848 may be presented for the user to select, and, responsive to the user selecting soft-button 848, a user interface 850 that provides extension instructions for interfacing with the securable device may be displayed for the user.

With regard to FIG. 8C, an illustration that includes a number of user interfaces for supporting a new rental process 800c is shown. The process 800c starts by presenting user interface 802, where the user may select the "active rental" soft-button 806. In response, the mobile kiosk may display user interface 816. In response to the user entering a correct PIN, the process 800c displays user interface 838. In response to the user electing to end his or her rental session, the user may select the "end" soft-button 844, which, in response, causes the mobile kiosk to display user interface 852 for final payment. The user interface 852 displays a final payment amount 854 that may include any overage from an initial rental fee for the securable device. In this case, the final payment amount 854 is shown as $1.00. The user is also presented with a "back" soft-button 856 and "next" soft-button 858. If the user selects the "back" soft-button 856, then the process returns to the previous user interface 838. In response the user selecting "next" soft-button 858, the process continues by displaying user interface 860 that notifies the user that the rental has ended. A "next" soft-button 862 may be presented, and, responsive to the user selecting the soft-button 862, user interface 864 may be displayed for the user with unlocking instructions along with a reminder message may be displayed for the user to remove all of his or her belongings from the locker. It should be understood that alternative instructions may be provided if the securable device is not a locker.

Figure 9A:
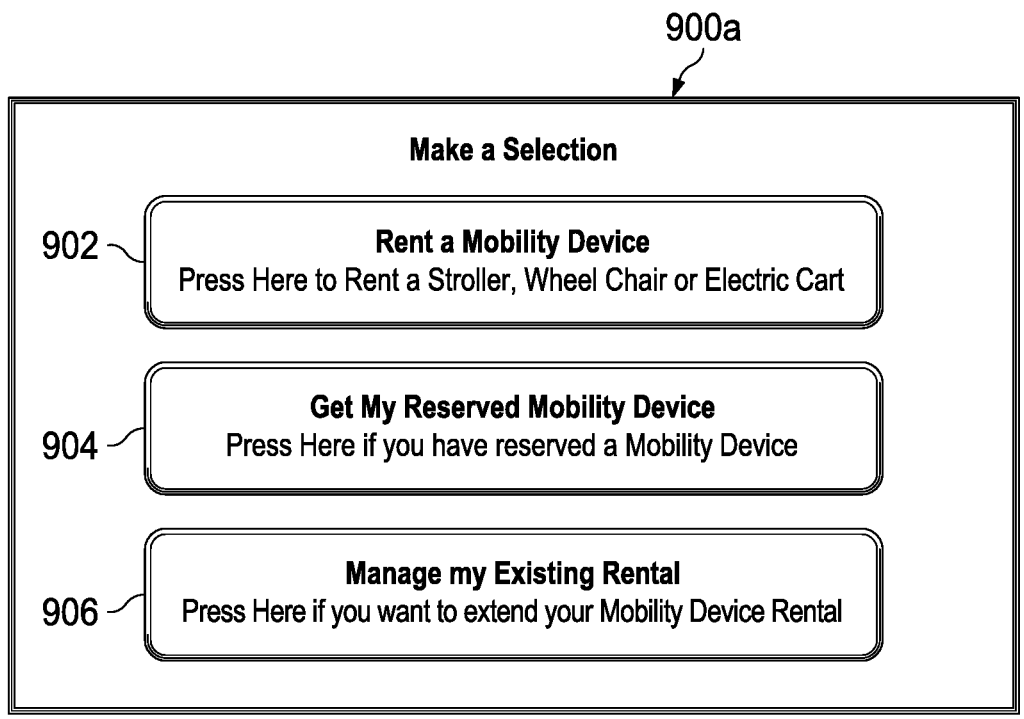
FIGS. 9A-9C are screenshots of illustrative user interfaces that are particular for renting mobility devices utilizing a mobile kiosk.
Figure 9B:
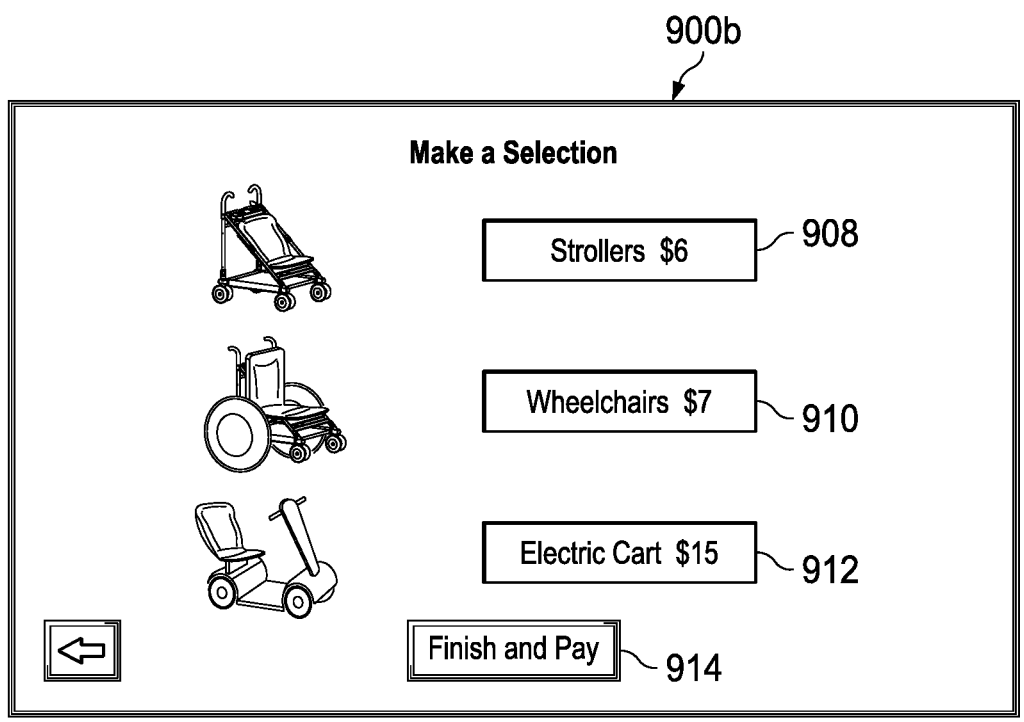
Figure 9C:
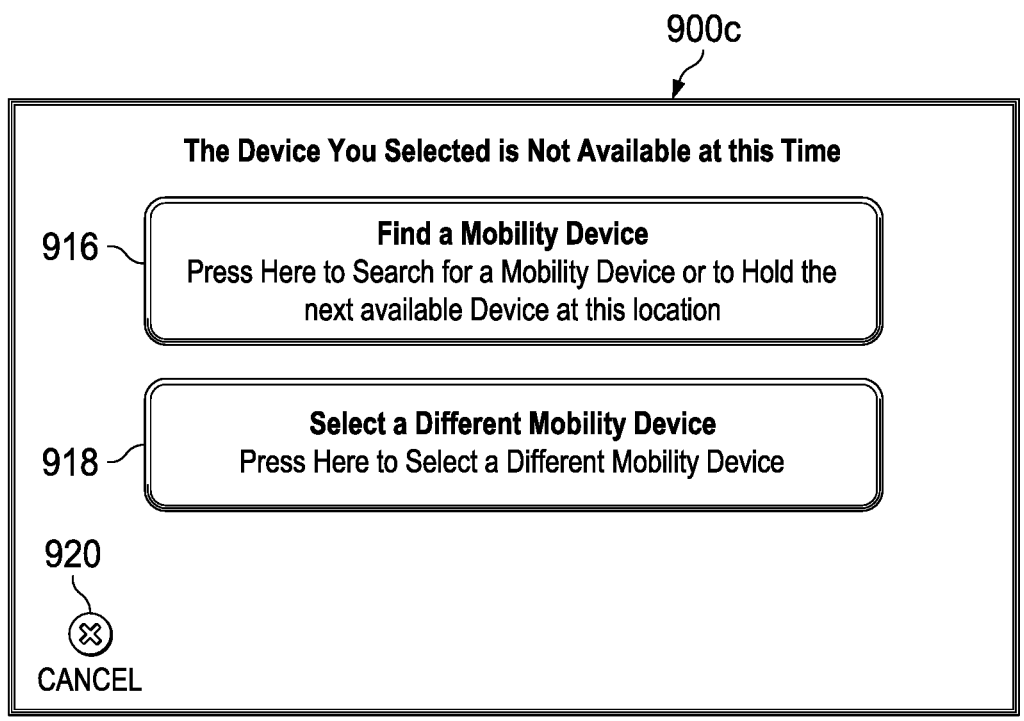

With regard to FIGS. 9A-9C, screenshots of illustrative user interfaces 900a-900c that are particular for renting mobility devices utilizing a mobile kiosk are shown. In one embodiment, because it is possible that the user may want to determine whether mobility devices are available prior to traveling to a location at which the mobility devices are available for rent, especially for people who have walking disabilities, the mobile kiosk may provide for rental and/or reserving a mobility device prior to visiting a location at which the mobility devices are positioned. The mobility devices may include strollers for infants, wheel chairs, electronic carts, skate boards, bicycles, and other unpowered and powered vehicles, as understood in the art. As shown in FIG. 9A, the user interface 900a provides three soft-buttons, a "Rent A Mobility Device" soft-button 902, "Get My Reserved Mobility Device" soft-button 904, and "Manage my Existing Rental" soft-button 906.

In response to a user selecting the soft-button 902 to rent a mobility device, user interface 900b of FIG. 9B may be displayed. The user interface 900b shows three illustrative mobility devices, including strollers, wheelchairs, and electric cards with associated soft-buttons 908, 910, and 912 that a user may select by tapping or otherwise selecting on his or her mobile device. In response to the user selecting one of the mobility devices, if a mobility device of the type selected, then the user may select a "Finish and Pay" soft-button 914 that brings the user to a user interface that enables the user to enter bank card information, as previously described. If the user is local to the mobility devices that are being locked by smart locks, then the mobile kiosk being executed by a mobile device of a user may communicate with the smart lock using a local communications path to communicate a code associated with a particular smart lock that is securing the selected mobility device and PIN that may be used to lock and unlock the smart lock. However, if a determination is made by the mobile kiosk or management server that no mobility devices of that type are currently available, the user interface 900c may be presented to notify the user that the type of mobility device selected is not available, and enable the user (i) to find another mobility device at a different location or be placed into a queue to put a hold on a next available device at the current location by selecting soft-button 916, (ii) select a different mobility device by selecting soft-button 918, or (iii) cancel requesting a mobility device by selecting soft-button 920.

If the user selects soft-button 916, then a search user interface (not shown) may be displayed to present the user with a list of alternative locations at which the desired mobility device is available or enable the user to be added to a queue or reservation list for a next available mobility device. As an example, in the case of renting a bicycle in a city, there may be a number of locations within the city at which bicycles available for rent or use (if part of a membership or other group that allows for anytime usage). A bicycle that meets the criteria selected by the user that is available at one or more other locations may be displayed in a list or other format, and the user may be able to rent or reserve one of the bicycles at the other location. In the case of the user adding his or her name to a queue, the user may be provided with a queue number along with an estimated time based on amounts of time that others have rented the bicycles or other mobility devices or a user may be contacted via text or email when the desired device becomes available.

In one embodiment, the mobile kiosk may use global position system (GPS) or other geographic location capabilities of a mobile device to determine geographic location of the mobile kiosk. The mobile kiosk may communicate the geographic coordinates to the management server or other computing system, and a determination may be made by the management server or other computing system what securable devices are local to the user of the mobile kiosk and how many of those securable devices are available. As an example, for mobility devices in the form of bicycles, a determination may be made that there are 6 racks of bicycles within 8 square blocks from a user of a mobile kiosk, and that within each of those racks, there are 3 bicycles currently available. The user may be able to reserve one of the bicycles and be given a pickup deadline of 20 minutes. Thereafter, the reserved bicycle may be released. By using a reservation system along with a queue for mobility devices, an operator may know to reposition or add additional mobility devices where demand exceeds supply.

In an embodiment, status information of each securable device in each set of securable devices may be stored and tracked. As an example, the status information may provide for a duration of time that each securable device is being rented and an amount of time that remains for each rental. In the event that all of the securable devices in a set of securable deices are being rented, the management server may determine times or durations of time that a next available securable device will become available for users who request a securable device and place the user in a queue. The users in the queue using the mobile kiosk may be communicated with status updates, notifications, and, optionally, a time remaining for each of the securable devices. In one embodiment, a list inclusive of securable device IDs and remaining rental times for each of the securable device IDs may be communicated to a mobile kiosk of a user to view. The mobile kiosk may track the remaining times for each of the securable devices thereafter, and any updates (e.g., rental extension) to the securable devices, may be communicated from the management server to the mobile kiosk of the user. In another embodiment, securable device banks (e.g., racks of mobility devices), total number of securable devices at each bank, and available number of securable devices at each bank may be provided to a mobile kiosk local (e.g., within a predetermined distance, such as 6 blocks, as established by default or as a preference by a user of a mobile kiosk) to the securable device banks.

TABLE II provides for a cloud management system to manage one or more securable device systems (1–N) and securable devices (1–M) at each of the securable device systems. It should be understood that the number of securable device systems may vary based on type of securable devices and locations of securable device systems (e.g., amusement park, ski slope, mailbox centers, mobility devices, urban setting, residential setting, etc.). It should also be understood that the number of securable devices within each of the securable device systems may vary based on type of securable devices, peak demands for securable devices in different geographic locations, and other factors.

TABLE II

Securable Device System Management for Mobile Kiosks

|  | Securable System 1 | Securable System 2 | . . . | Securable System N |
|---|---|---|---|---|
| Securable Device 1 | T: 46 min | T: 242 min | . . . | Avail |
| Securable Device 2 | Avail | T: 12 min | . . . | Reserved; T: 9 mins |
| . . . | . . . | . . . | . . . | . . . |
| . . . | . . . | . . . | . . . | . . . |
| Securable Device M | T: 8 min | T: 32 min; 1 renewal | . . . | T: 125 min |
| Total Available | 6 | 0; Next Avail 12 mins | . . . | 15 |
| Queue Length | 0 | 6 | . . . | 0 |
| Your Queue Spot | — | 3 | . . . | — |

As shown in TABLE II, each of the securable devices that are rented or currently being utilized may have a time T associated therewith to indicate an amount of time remaining for rental of that securable device, while each of the securable devices that are currently available are indicated as being available. If a securable device is currently reserved, the table shows that the securable device is currently reserved for a remaining amount of time T (e.g., Securable System N, Securable Device 2 is reserved for another 9 minutes). It is also shown that securable system 2, securable device M had 1 renewal, so the remaining time of 32 minutes will complete the 1st renewal for the user of that securable device. Upon the time T running out, that securable device becomes released, unless renewed by the user, and available for another user. Because the management system may operate as a central controller, the management system may collect the status information of each of the securable devices that have been rented via the mobile kiosks and update one or more data repositories from which the data in the table is derived.

In one embodiment, the management system may communicate the data presented in the table associated with each of the securable device systems and securable devices in the securable device systems that are local to or requested by a user of a mobile kiosk. For example, when a user is at a securable device system that is securing bicycles using smart locks as described herein, the management system may communicate some or all of the data to the mobile kiosk to allow the user to view which bicycles are available, reserved, or when expected to return to become available. The table cannot show, however, whether any of the securable devices that are currently being utilized will be renewed or extended by a current user, but may indicate, as described above, that a securable device has been extended already. Hence, the available times are estimates. In one embodiment, a number of renewals may be limited to a certain number, such as 2 renewals per user, such that a final available time may be known if the rental time has a maximum amount of time (e.g., 2 hours). As an example, if a user rents a securable device for 2 hours and there are 2 maximum number of renewals, then the maximum amount of time that the user may rent the securable device is 6 hours.

Below the securable devices is a listing of various summarized statistics, including total securable devices available, queue length for each securable system, and a user's queue spot. In one embodiment, rather than having a single queue for each of the securable device systems, individual securable devices may have a separate queue (not shown), thereby allowing for different types of securable devices that are more popular than others (e.g., different types of scooters) to have a queue and treated differently than others. These statistics may be communicated to the mobile kiosks for users to view, and, optionally, set conditions or notifications based on the statistics via the mobile kiosk (e.g., send notice 15 minutes prior to estimated release of securable device).

In one embodiment, the management server may be configured to provide directions and other information to users of mobile kiosks to find an available securable device that is within a predetermined distance or adjustable distance from a user. In one embodiment, directions may be provided by executing a mapping app on the mobile device by automatically inserting the starting and ending locations for the user. As an example, if all of the securable devices of a securable device system (e.g., securable device system 2), then the management server may communicate a message to the mobile kiosk of the user in response to or as a default of a next closest securable device system (e.g., securable device system 1) that has available securable devices of the type desired. In an alternative embodiment, the mobile kiosk may automatically request a next closest and available securable device in the event that no securable devices are available at a local or nearest securable device system. In an alternative embodiment, the mobile kiosk may automatically ask the user whether he or she would like to be directed to a currently available securable device or wait for a next available securable device by being added to a queue at the closest securable device system.

In the event that the user is added to a queue for a securable device, notifications of when a securable device will be available for the user may be communicated to the user. Because it is possible that the availability may not actually occur in the event that the current user of the securable device extends or does not return the securable device, the notices may indicate that a securable is "estimated to be available" at a certain time, along with notifying the user as to his or her position in the queue. The mobile kiosk may also be configured to enable the user to remove him or herself from the queue, which, in turn, updates the management server to update and notify other users in the queue.

Synchronization of the management server and mobile kiosks may use a push or pull system that either pushes status updates or pulls status updates to or from the mobile kiosk. The synchronization may be performed periodically (e.g., once per minute) or aperiodically (e.g., event triggered, such as in response to a user of a mobile kiosk requesting an update or a user returning a securable device). A combination of periodic and aperiodic synchronization of the information for securable devices may also be performed.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method of controlling a securable device in a set of securable devices, said method comprising:
    establishing a centralized data repository with data representative of status of each securable device in the set of securable devices;
    establishing communications with a mobile kiosk application executing on a mobile device of a user;
    responsive to receiving a request from a mobile kiosk to identify an available securable device local and accessible to the user:
    accessing the centralized data repository;
    identifying at least one securable device that is available; and
    communicating data associated with the identified at least one available securable device to the mobile kiosk to cause the mobile kiosk to communicate at least a portion of the data to one of the at least one securable devices to enable the user to access the securable device;
    responsive to receiving a status update of the securable device accessed by the user from the mobile kiosk, updating the centralized data repository with the status update of the associated securable device; and
    responsive to updating the centralized data repository with the status update of the associated securable device, communicating the status update to other mobile kiosks.

2. The method according to claim 1, wherein causing the mobile kiosk to communicate at least a portion of the data includes causing the mobile kiosk to communicate with the securable device via a local communications protocol.

3. The method according to claim 1, wherein receiving a request from the mobile kiosk includes receiving an identifier associated with the set of securable devices.

4. The method according to claim 1, wherein establishing a centralized data repository includes establishing a centralized data repository with status data indicative of an enclosure of the securable devices being locked or unlocked.

5. The method according to claim 1, wherein receiving the request further comprises:
    receiving a request to rent an available securable device for a predetermined period of time;
    receiving payment information associated with the user;

performing a payment transaction using the payment information for the predetermined period of time; and
responsive to completion of the payment transaction, communicating the data associated with the available securable device to the mobile kiosk.

6. The method according to claim 1, further comprising:
determining that each of the securable devices local to the user are unavailable;
adding the user to a queue inclusive of users waiting for a securable device;
determining, based on status information stored in the centralized data repository, an estimated time that a securable device will be available for the user based on a position of the user in the queue; and
communicating the estimated time that a securable device will be available to the mobile kiosk of the user.

7. The method according to claim 1,
wherein receiving the request includes receiving a request with a type of securable device desired; and
wherein identifying at least one securable device that is available includes identifying at least one securable device of the type requested.

8. The method according to claim 1, wherein receiving a request from the mobile kiosk to access a securable device includes receiving a request from the mobile kiosk to access a securable device that is securing a mobility device.

9. The method according to claim 1, further comprising,
in response to determining that each of the securable devices local to the user are unavailable, adding the user to a queue inclusive of users waiting for a securable device; and
in response to a securable device becoming available, communicating a notice to the user of the availability of the securable device.

10. The method according to claim 9, further comprising, successively communicating the notice to users waiting for a securable device in the queue.

11. The method according to claim 1, further comprising receiving a reservation request from the user for one of the securable devices.

12. The method according to claim 11, wherein receiving a reservation request from the user includes receiving a reservation request from the user via the mobile kiosk.

13. A mobile kiosk, comprising:
machine-readable instructions configured to execute on a mobile device, and, when the machine-readable instructions are executed by the mobile device, cause the mobile device to:
communicate a request via a long-distance communications path to a management server, the request including an identifier associated with a plurality of securable devices;
responsive to one of the securable devices being assigned to a user of the mobile kiosk, communicate a control signal via a local communications path with the assigned securable device, the control signal causing the securable device to transition from a locked state to an unlocked state;
responsive to receiving a status update from the securable device via the local communications path of the securable device transitioning from the locked state to the unlocked state, communicating, via the long-distance communications path to the management server, the status update of the securable device;
add the user to a queue inclusive of users waiting for a securable device in response to determining that each of the securable devices local to the user are unavailable;
receive a communication including a notice to the user based on a position in the queue; and
provide a notice to the user of the availability of the securable device in response to a securable device becoming available.

14. The mobile kiosk according to claim 13, wherein the machine-readable instructions, when executed by the mobile device, are further configured to enable a user to enter payment information for renting the securable device.

15. The mobile kiosk according to claim 13, wherein the machine-readable instructions, when executed by the mobile device, are further configured to enable a user to enter a type of securable device the user wants to rent and amount of time that the user wants to rent the securable device.

16. The mobile kiosk according to claim 13, wherein the securable device is a locker or room safe.

17. The mobile kiosk according to claim 13, wherein the securable device is a mobility device or other device secured by a smart lock.

18. The mobile kiosk according to claim 13, wherein the machine-readable instructions, when executed by the mobile device, are further configured to display information indicative of an estimate amount of time that the user has prior to a securable device becoming available.

19. The mobile kiosk according to claim 13, wherein the machine-readable instructions, when executed by the mobile device, are further configured to display status information of each of the securable devices local to the mobile kiosk.

20. The mobile kiosk according to claim 13, wherein the machine-readable instructions, when executed by the mobile device, are further configured to receive a reservation request from the user for one of the securable devices.

21. A method of controlling an electromechanical lock that is electronically controlled, comprising:
establishing, by a communications device associated with the electromechanical lock, a local communications link with one mobile device, the electromechanical lock being functionally responsive to a control signal including a unique communications network identifier and either including a unique user identifier or being generated in response to receipt of a unique user identifier;
responsive to receiving a control signal via the local communications path, the control signal causing the securable device to transition between a locked state and an unlocked state;
responsive to the electromechanical lock transitioning between the locked state and the unlocked state, communicating a status update via the local communications path of the securable device transitioning between the locked state and the unlocked state;
preventing, by the mobile device or a processor associated with the electromechanical lock in response to a rental time expiring, a control signal associated with the user from causing the securable device to transition between the locked state and the unlocked state;
generating a status update of the electromechanical lock being accessed by a communications device, updating a centralized data repository with the status update of the associated electromechanical lock; and responsive to updating the centralized data repository with the status update of the associated securable device, communicating the status update to other mobile devices.

22. The method according to claim 21, wherein receiving a control signal includes receiving a control signal inclusive of the network identifier of the securable device.

23. The method according to claim 21, wherein communicating the status update further includes communicating the network identifier in association with the status update.

24. The method according to claim 21, wherein the unique user identifier is a PIN of a user.

\* \* \* \* \*